US009880653B2

(12) United States Patent
Baharv et al.

(10) Patent No.: US 9,880,653 B2
(45) Date of Patent: Jan. 30, 2018

(54) PRESSURE-SENSING TOUCH SYSTEM UTILIZING TOTAL-INTERNAL REFLECTION

(71) Applicant: Corning Incorporated, Corning, NY (US)

(72) Inventors: Izhak Baharv, Palo Alto, CA (US); Jeffrey Stapleton King, Menlo Park, CA (US)

(73) Assignee: Corning Incorporated, Corning, NY (US)

( * ) Notice: Subject to any disclaimer, the term of this patent is extended or adjusted under 35 U.S.C. 154(b) by 0 days.

(21) Appl. No.: 13/826,110

(22) Filed: Mar. 14, 2013

(65) Prior Publication Data

US 2013/0285977 A1    Oct. 31, 2013

Related U.S. Application Data

(60) Provisional application No. 61/640,605, filed on Apr. 30, 2012.

(51) Int. Cl.
  *G06F 3/045* (2006.01)
  *G06F 3/041* (2006.01)
  *G06F 3/042* (2006.01)

(52) U.S. Cl.
  CPC .......... *G06F 3/0414* (2013.01); *G06F 3/0428* (2013.01); *G06F 2203/04105* (2013.01); *G06F 2203/04109* (2013.01)

(58) Field of Classification Search
  CPC ........ G06F 3/041; G06F 3/0414; G06F 3/042; G06F 3/0421; G06F 3/0428;
  (Continued)

(56) References Cited

U.S. PATENT DOCUMENTS

| 4,346,376 A | 8/1982 | Mallos |
| 4,484,179 A | 11/1984 | Kasday ..................... 340/365 |

(Continued)

FOREIGN PATENT DOCUMENTS

| CN | 2156492 | 2/1994 |
| EP | 0901229 | 6/2007 |

(Continued)

OTHER PUBLICATIONS

"Monolithic." Dictionary.com Unabridged. Random House, Inc. Jul. 9, 2015. <Dictionary.com http://dictionary.reference.com/browse/monolithic>.*

(Continued)

*Primary Examiner* — Ilana Spar
*Assistant Examiner* — Brent D Castiaux

(57) ABSTRACT

A pressure-sensing touch system that utilizes total-internal reflection of light is disclosed. The touch system includes a transparent sheet having a surface. At least one light source and at least one detector are operably arranged relative to the transparent sheet respective to transmit light through the sheet and to detect the transmitted light. A touch event at the top surface of the transparent sheet causes light to scatter from the transparent sheet, thereby changing the amount of light received at the detector. Since the amount of scattered light generated at the touch event location is a function of the applied pressure at the touch event, the change in the detector signal is used to determine the relative amount of applied pressure. Embodiments that include multiple waveguides and channel waveguides, as well as force-sensing devices, are also disclosed.

19 Claims, 19 Drawing Sheets

(58) Field of Classification Search
CPC ..... G06F 2203/014; G06F 2203/04105; G06F 2203/04106; G06F 2203/04108; G06F 2203/04109
USPC .................. 345/156, 173, 175, 176
See application file for complete search history.

(56) References Cited

U.S. PATENT DOCUMENTS

| | | | |
|---|---|---|---|
| 4,511,760 A | 4/1985 | Garwin et al. .................. 178/18 |
| 4,542,375 A | 9/1985 | Alles et al. .................... 340/712 |
| 4,687,885 A | 8/1987 | Talmage, Jr. et al. ......... 178/18 |
| 4,725,978 A | 2/1988 | Fujioka ........................ 364/900 |
| 5,222,400 A | 6/1993 | Hilton ....................... 73/862.043 |
| 5,446,480 A | 8/1995 | Yoshida ........................ 345/157 |
| 5,610,629 A | 3/1997 | Baur ............................ 345/104 |
| 6,031,520 A | 2/2000 | De Gotari .................... 345/157 |
| 6,084,571 A | 7/2000 | De Gotari .................... 345/157 |
| 6,326,948 B1 | 12/2001 | Kobachi et al. ............. 345/157 |
| 6,504,530 B1 | 1/2003 | Wilson et al. ................ 345/173 |
| 6,556,149 B1 | 4/2003 | Reimer et al. .................. 341/20 |
| 6,788,295 B1 | 9/2004 | Inkster ........................ 345/175 |
| 6,804,012 B2 | 10/2004 | Gombert ...................... 356/614 |
| 6,816,537 B2 | 11/2004 | Liess ............................ 372/109 |
| 6,900,795 B1 | 5/2005 | Knight, III et al. .......... 345/173 |
| 7,157,649 B2 | 1/2007 | Hill ........................... 178/18.04 |
| 7,158,054 B2 | 1/2007 | Pihlaja .......................... 341/22 |
| 7,298,367 B2 | 11/2007 | Geaghan et al. |
| 7,417,627 B2 | 8/2008 | Cok ............................ 345/173 |
| 7,432,893 B2 | 10/2008 | Ma et al. |
| 7,442,914 B2 | 10/2008 | Eliasson et al. |
| 7,465,914 B2* | 12/2008 | Eliasson ............... G06F 3/0414 250/221 |
| 7,515,140 B2 | 4/2009 | Philipp ........................ 345/173 |
| 7,666,511 B2 | 2/2010 | Ellison et al. |
| 7,685,538 B2 | 3/2010 | Fleck et al. .................. 715/863 |
| 7,705,835 B2 | 4/2010 | Eikman |
| 7,737,959 B2 | 6/2010 | Gruhlke et al. |
| 7,786,978 B2 | 8/2010 | Lapstun et al. ............. 345/166 |
| 7,903,090 B2 | 3/2011 | Soss et al. ................... 345/173 |
| 7,920,124 B2 | 4/2011 | Tokita et al. ................ 345/156 |
| 8,049,728 B2 | 11/2011 | Choo et al. |
| 8,049,739 B2 | 11/2011 | Wu et al. ..................... 345/175 |
| 8,054,296 B2* | 11/2011 | Land ..................... G06F 3/0418 178/18.01 |
| 8,075,999 B2 | 12/2011 | Barefoot et al. |
| 8,130,210 B2 | 3/2012 | Saxena et al. ............... 345/175 |
| 8,158,543 B2 | 4/2012 | Dejneka et al. |
| 8,179,375 B2 | 5/2012 | Ciesla et al. ................. 345/173 |
| 8,187,987 B2 | 5/2012 | Amin et al. |
| 8,248,388 B2 | 8/2012 | Park et al. |
| 8,253,712 B2 | 8/2012 | Klinghult ..................... 345/174 |
| 8,325,158 B2 | 12/2012 | Yatsuda et al. .............. 345/176 |
| 8,368,677 B2 | 2/2013 | Yamamoto ................... 345/207 |
| 8,378,975 B2 | 2/2013 | Yoon et al. .................. 345/173 |
| 8,390,481 B2 | 3/2013 | Pance et al. ................... 341/33 |
| 8,395,601 B2 | 3/2013 | Nho et al. ................... 345/176 |
| 8,411,068 B2 | 4/2013 | Lu et al. ...................... 345/175 |
| 8,553,014 B2 | 10/2013 | Holmgren et al. .......... 345/176 |
| 8,842,076 B2 | 9/2014 | Doray et al. |
| 9,046,961 B2 | 6/2015 | King et al. |
| 9,280,279 B2 | 3/2016 | Atkins et al. |
| 2001/0007449 A1 | 7/2001 | Kobachi et al. ............. 345/156 |
| 2003/0026971 A1 | 2/2003 | Inkster et al. .............. 428/304.4 |
| 2005/0191062 A1 | 9/2005 | Rafferty et al. |
| 2005/0248540 A1 | 11/2005 | Newton |
| 2006/0096392 A1 | 5/2006 | Inkster et al. ............. 73/862.041 |
| 2006/0158437 A1 | 7/2006 | Blythe et al. |
| 2006/0227120 A1 | 10/2006 | Eikman |
| 2006/0290684 A1 | 12/2006 | Giraldo et al. |
| 2007/0125937 A1 | 6/2007 | Eliasson et al. |
| 2008/0007540 A1* | 1/2008 | Ostergaard ............ G06F 3/0421 345/176 |
| 2008/0007542 A1* | 1/2008 | Eliasson ................ G06F 3/0346 345/176 |
| 2008/0062156 A1 | 3/2008 | Abileah et al. |
| 2008/0068343 A1 | 3/2008 | Hoshino et al. ............. 345/173 |
| 2008/0088593 A1 | 4/2008 | Smoot |
| 2008/0088597 A1 | 4/2008 | Prest et al. ................... 345/173 |
| 2008/0088600 A1 | 4/2008 | Prest et al. ................... 345/173 |
| 2008/0185782 A1 | 8/2008 | Rom |
| 2008/0284742 A1 | 11/2008 | Prest et al. ................... 345/173 |
| 2008/0284925 A1* | 11/2008 | Han ................................ 349/12 |
| 2008/0286548 A1 | 11/2008 | Ellison et al. |
| 2008/0289884 A1 | 11/2008 | Elwell ....................... 178/18.01 |
| 2008/0303797 A1 | 12/2008 | Grothe ........................ 345/173 |
| 2009/0015564 A1 | 1/2009 | Ye et al. ...................... 345/173 |
| 2009/0153519 A1 | 6/2009 | Suarez Rovere |
| 2009/0215607 A1 | 8/2009 | Dejneka et al. |
| 2009/0219253 A1 | 9/2009 | Izadi et al. .................. 345/173 |
| 2009/0219261 A1 | 9/2009 | Jacobson et al. ............ 345/175 |
| 2010/0001978 A1 | 1/2010 | Lynch et al. ................ 345/175 |
| 2010/0060548 A1 | 3/2010 | Choi et al. .................... 345/1.3 |
| 2010/0079407 A1 | 4/2010 | Suggs |
| 2010/0103123 A1 | 4/2010 | Cohen et al. ................ 345/173 |
| 2010/0103140 A1 | 4/2010 | Hansson ...................... 345/175 |
| 2010/0117974 A1 | 5/2010 | Joguet et al. ................ 345/173 |
| 2010/0117989 A1 | 5/2010 | Chang ......................... 345/175 |
| 2010/0156847 A1 | 6/2010 | No et al. ..................... 345/175 |
| 2010/0182168 A1 | 7/2010 | Van De Wijdeven et al. |
| 2010/0207906 A1 | 8/2010 | Anglin et al. ............... 345/174 |
| 2010/0245288 A1 | 9/2010 | Harris ......................... 345/175 |
| 2010/0253650 A1 | 10/2010 | Dietzel et al. ............... 345/175 |
| 2010/0295821 A1 | 11/2010 | Chang et al. |
| 2010/0302196 A1 | 12/2010 | Han et al. |
| 2010/0321310 A1 | 12/2010 | Kim et al. ................... 345/173 |
| 2010/0322550 A1* | 12/2010 | Trott ...................... G06F 3/03547 385/12 |
| 2011/0062849 A1* | 3/2011 | Carlson ..................... C03C 3/093 313/110 |
| 2011/0122091 A1* | 5/2011 | King ........................ G06F 3/0421 345/175 |
| 2011/0141053 A1 | 6/2011 | Bulea et al. ................. 345/174 |
| 2011/0148819 A1 | 6/2011 | Yu |
| 2011/0157092 A1* | 6/2011 | Yang ....................... G06F 3/0421 345/175 |
| 2011/0163997 A1 | 7/2011 | Kim |
| 2011/0199340 A1 | 8/2011 | Aikio et al. |
| 2011/0221705 A1* | 9/2011 | Yi ............................ G06F 3/0425 345/175 |
| 2011/0221997 A1 | 9/2011 | Kim et al. |
| 2011/0227874 A1 | 9/2011 | Fahraeus et al. |
| 2011/0234537 A1 | 9/2011 | Kim |
| 2011/0298742 A1 | 12/2011 | Dingnan ..................... 345/173 |
| 2012/0038593 A1 | 2/2012 | Ronka et al. |
| 2012/0068939 A1 | 3/2012 | Pemberton-Pigott ........ 345/173 |
| 2012/0068970 A1 | 3/2012 | Pemberton-Pigott ........ 345/175 |
| 2012/0068971 A1 | 3/2012 | Pemberton-Pigott ........ 345/175 |
| 2012/0071206 A1 | 3/2012 | Pemberton-Pigott ........ 455/566 |
| 2012/0092250 A1 | 4/2012 | Hadas et al. ................. 345/156 |
| 2012/0176345 A1 | 7/2012 | Ye et al. ...................... 345/175 |
| 2012/0212451 A1 | 8/2012 | Large et al. .................. 345/175 |
| 2012/0242607 A1 | 9/2012 | Ciesla et al. ................ 345/173 |
| 2012/0326981 A1 | 12/2012 | Kurose ........................ 345/160 |
| 2013/0107306 A1 | 5/2013 | Yoon et al. ................... 358/1.13 |
| 2013/0135254 A1 | 5/2013 | Lee et al. ..................... 345/175 |

FOREIGN PATENT DOCUMENTS

| | | |
|---|---|---|
| EP | 2392904 | 12/2011 |
| EP | 2437144 | 4/2012 |
| EP | 2437145 | 4/2012 |
| EP | 2439620 | 4/2012 |
| EP | 2439619 | 5/2012 |
| FR | 2963839 | 8/2010 |
| GB | 2313195 | 11/1997 |
| JP | 2009199427 A | 9/2009 |
| JP | 2011103094 | 5/2011 |
| KR | 2011017239 | 2/2011 |
| WO | 02/35460 | 5/2002 |
| WO | 2010/063320 | 6/2010 |
| WO | 2011028169 | 3/2011 |
| WO | 2011028170 | 3/2011 |
| WO | 2011078769 | 6/2011 |

(56) References Cited

FOREIGN PATENT DOCUMENTS

| WO | 2011095638 | 8/2011 |
|----|------------|--------|
| WO | 2012/027599 | 3/2012 |
| WO | 2012/087286 | 6/2012 |
| WO | 2013/029641 | 3/2013 |
| WO | 2013/037385 | 3/2013 |
| WO | 2013/068651 | 5/2013 |

OTHER PUBLICATIONS

U.S. Appl. No. 61/564,003, filed Nov. 28, 2011.
U.S. Appl. No. 61/564,024, filed Nov. 28, 2011.
http://dl.dropbox.com/u/56644/MRS_RobertKoeppe.ppt.
Kristen L. Barefoot et al.; U.S. Appl. No. 12/537,393; entitled "Strengthened Glass Articles and Methods of Making".
Jaymin Amin et al.; U.S. Appl. No. 12/545,475; entitled "Durable Glass Housings/Enclosures for Electronic Devices".
Sumriddetchkajorn et al.; "Ultra-High Contrast Low-Leadage-Light Optical Touch Device Structures Using Light Scattering and Total Internal Reflection Concepts"; Sensors and Actuators A, 126 (2006) 68-72.
G. Kodl.; "A New Optical Waveguide Pressure Sensor Using Evanescent Field"; IEEE, 2004 Electronic Components and Technology Conference, pp. 1943-1946.
PCT International Search Report, dated Jun. 24, 2013.
Machine translation of JP2011-103094.
Machine translation of FR2963839.
English Translation of CN201380022482.0 Notice of First Office Action dated Jul. 15, 2016; 25 Pages; Chinese Patent Office.
English Translation of JP2015510323 Office Action dated Jan. 5, 2017, Japan Patent Office.

\* cited by examiner

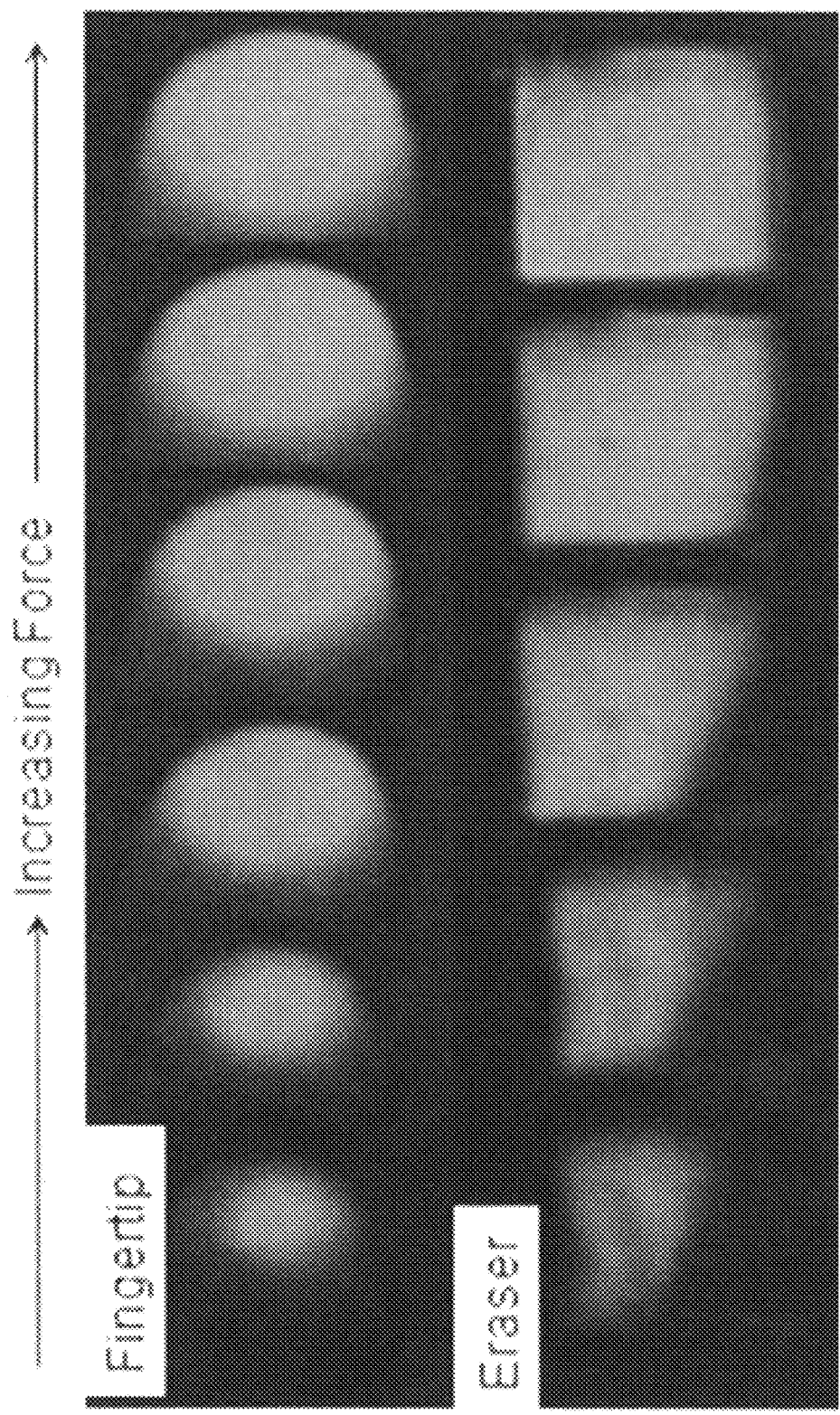

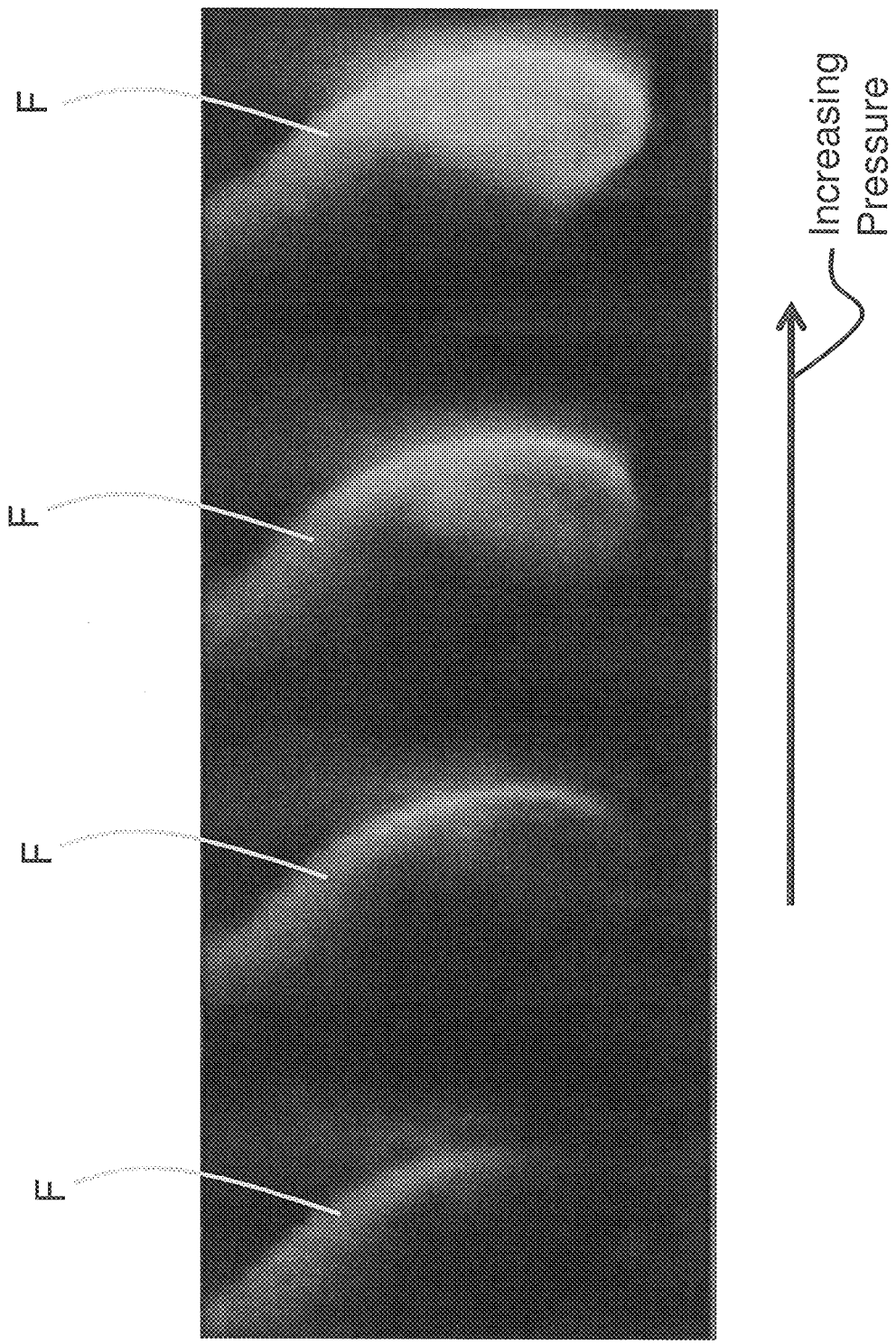

PRESSURE-SENSING TOUCH SYSTEM UTILIZING TOTAL-INTERNAL REFLECTION

CROSS-REFERENCE TO RELATED APPLICATIONS

This application claims the benefit of priority under 35 U.S.C. § 119 of U.S. Provisional Application Ser. No. 61/640,605 filed on Apr. 30, 2012, the content of which is relied upon and incorporated herein by reference in its entirety.

FIELD

The present invention relates to touch-sensitive devices, and in particular to pressure-sensing touch systems that utilize the total-internal reflection of light.

BACKGROUND ART

The market for displays and other devices (e.g., keyboards) having non-mechanical touch functionality is rapidly growing. As a result, a variety of touch-sensing techniques has been developed to enable displays and other devices to have touch functionality. Touch-sensing functionality is gaining wider use in mobile device applications, such as smart phones, e-book readers, laptop computers and tablet computers.

Touch systems in the form of touch screens have been developed that respond to a variety of types of touches, such as single touches, multiple touches, swiping, and touches having different pressures. However, pressure-sensing touch screens and other touch systems typically rely on conventional pressure sensors to sense the touch pressure and are thus relatively complex and expensive to manufacture.

SUMMARY

An aspect of the disclosure is a pressure-sensing touch system for sensing an amount of pressure at a location of a touch event. The system includes a transparent sheet having a top surface, a bottom surface, and a perimeter that includes an edge, wherein the touch event occurs on the top surface at a touch event location. The system also has at least one light source operably arranged relative to the transparent sheet and that emits light that is coupled into the transparent sheet so that the light travels within the transparent sheet via total internal reflection. The system also includes at least one detector operably disposed relative to the transparent sheet and the light source. The detector generates a detector electrical signal having a signal strength representative of a detected intensity of light traveling within the transparent sheet, wherein the touch event causes a change in the detected light intensity that corresponds to a change in pressure applied at the touch event location.

Another aspect of the disclosure is the system described above, and further comprising a controller operably coupled to the at least one light source and the at least one detector. The controller is configured to receive the detector electrical signal and determine the change in the pressure applied at the touch event location.

Another aspect of the disclosure is the system described above, further comprising the light source being wavelength modulated to form intensity modulated light at the detector. The modulated intensity can be complex due to the interference of light traveling over many different light paths and create a speckle effect that is sensitive to a touch event, wherein the touch event interferes with some of the light paths that form the speckle pattern at the detector, thereby causing a change in the detector electrical signal representative of a change in pressure at the touch event location.

Another aspect of the disclosure is the system described above, wherein the detector electrical signal is processed by the controller to determine a modulation contrast representative of the change in pressure applied at the touch event location.

Another aspect of the disclosure is the system described above, wherein the transparent sheet is substantially transparent to infrared (IR) light, wherein the emitted light from the at least one light sources comprises IR light, and wherein the at least one detector is configured to detect the IR light.

Another aspect of the disclosure is the system described above, further comprising the top surface being a roughened surface.

Another aspect of the disclosure is the system described above, wherein the roughened surface has features having a size between 100 microns and 500 microns.

Another aspect of the disclosure is the system described above, further comprising a layer disposed on the top surface of the transparent sheet, wherein the layer enhances at least one of a) pressure sensing sensitivity and b) a range of detectable pressure.

Another aspect of the disclosure is the system described above, wherein first and second layers are disposed on the top and bottom surfaces of the transparent sheet, wherein the first and second layers have a refractive index greater than the transparent sheet and that serve as first and second waveguides that carry light between the light source and the detector.

Another aspect of the disclosure is the system described above; wherein the transparent sheet includes a body, with the system further comprising an ion-exchanged region in the body of the transparent sheet adjacent the top surface of the transparent layer. The ion-exchanged region defines a surface waveguide and the body of the transparent layer defines a bulk waveguide. The surface waveguide and bulk waveguide act to direct (carry) light from the light source to the detector. In an example, the surface and bulk waveguide, together with the light source and detector, define an optical interferometer.

Another aspect of the disclosure is the system described above, further comprising at least one force-sensing device operably arranged relative to the transparent sheet to measure an amount of force associated with the touch event.

Another aspect of the disclosure is the system described above, wherein the system includes a controller operably coupled to the at least one force-sensing device and that is configured to convert the measured amount of force to a pressure associated with the touch event. In an example, this is accomplished by knowing, measuring or estimating the area of optical contact associated with the touch event.

Another aspect of the disclosure is the system described above, wherein the at least one force-sensing device is selected from the group of force-sensing devices comprising: a force-sensing resistor, a piezo-electric-based force-sensing device, a strain gauge based on an electric circuit, an optical strain gauge, a capacitive strain gauge, and an accelerometer-based force sensor.

Another aspect of the disclosure is a display system that has pressure-sensing capability and that includes the pressure-sensing touch system as described herein, and a display unit having a display, with the pressure-sensing touch system operably arranged adjacent the display. The resulting display system has pressure-sensing capability that can work in conjunction with touch-location capability of the display system. Alternatively, the pressure-sensing touch system can have touch-location capability.

Another aspect of the disclosure is a method of determining a relative amount of pressure applied by an implement at a location of a touch event on a top surface of a transparent sheet. The method includes sending light from at least one light source through the transparent sheet by total-internal reflection. The method further includes detecting the light at least one detector and generating a first detector electrical signal, wherein the detected light is either scattered by or attenuated in proportion to the amount of applied pressure of the implement at the top surface. The method also includes determining from the first detector electrical signal the amount of pressure applied by the implement at the location of the touch event.

Another aspect of the disclosure is the method described above, wherein the implement is either a finger, a pencil, a pen or a stylus.

Another aspect of the disclosure is the method described above, further comprising measuring a baseline detector electrical signal in the absence of a touch event and comparing the first detector electrical signal to the baseline detector electrical signal to determine the amount of pressure applied by the implement at the location of the touch event.

Another aspect of the disclosure is the method described above, wherein the light has a wavelength and further comprising: modulating the wavelength of the light; passing the wavelength-modulated light through a grating to divide the light incident upon the grating into first and second light beams; detecting the first and second light beams so that the first detector electrical signal includes intensity modulation information; and processing the first detector electrical signal to determine a modulation contrast representative of the relative amount of pressure applied by the implement at the location of the touch event. In an example, there are multiple first light beams and multiple second light beams sufficient to give rise to a speckle interference pattern at the detector.

Another aspect of the disclosure is the method described above, further comprising measuring a force exerted by the implement at the touch event location using one or more force-sensing devices operably arranged relative to the transparent sheet.

Another aspect of the disclosure is the method described above, further comprising forming the top surface as a rough surface.

Another aspect of the disclosure is the method described above, further comprising providing a layer atop the top surface, wherein the layer enhances pressure sensing sensitivity and/or a pressure range.

Another aspect of the disclosure is the method described above, comprising disposing the at least one light source and the at least one detector at a common side or a common surface of the transparent sheet.

Another aspect of the disclosure is the method described above, comprising disposing the at least one light source and the at least one detector at different edges of the transparent sheet.

Additional features and advantages of the disclosure are set forth in the detailed description that follows, and in part will be readily apparent to those skilled in the art from that description or recognized by practicing the disclosure as described herein, including the detailed description that follows, the claims, and the appended drawings.

The claims as well as the Abstract are incorporated into and constitute part of the Detailed Description set forth below.

All publications, articles, patents, published patent applications and the like cited herein are incorporated by reference herein in their entirety, including U.S. Patent Application Publication No. 2011/0122091 and U.S. Provisional Patent Applications No. 61/564,003 and 61/564,024.

BRIEF DESCRIPTION OF THE DRAWINGS

FIG. 8A shows images of a fingertip (top row) and an eraser (bottom row) taken in red light and showing from left to right increasing amounts of pressure being applied to a transparent sheet by the finger and the eraser, wherein the transparent sheet is carrying the red light via TIR;

FIG. 8B is a series of images of a finger being applied to the top surface of a transparent sheet with increasing amounts of pressure from left to right, and illustrating the increasing amounts of light scattering from the transparent sheet as a function of the applied pressure;

Additional features and advantages of the disclosure are set forth in the Detailed Description that follows and will be apparent to those skilled in the art from the description or recognized by practicing the disclosure as described herein, together with the claims and appended drawings.

Cartesian coordinates are shown in certain of the Figures for the sake of reference and are not intended as limiting with respect to direction or orientation.

DETAILED DESCRIPTION

Figure 1:
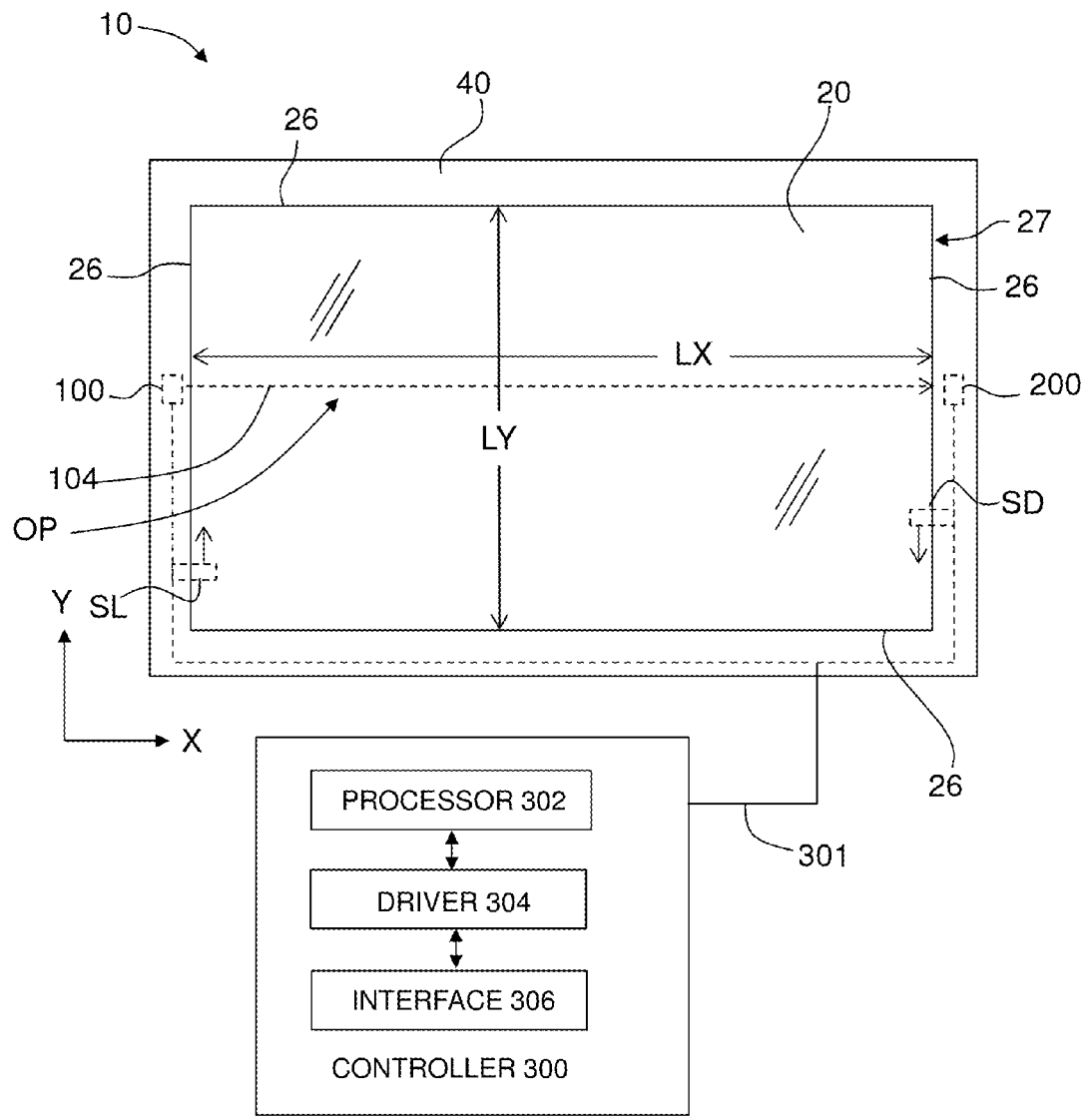
FIG. 1 is a face-on view of an example pressure-sensing touch system according to the disclosure.

FIG. 1 is a schematic diagram of an example pressure-sensing touch system 10 according to the disclosure. The pressure-sensing touch system 10 may be used in a variety of consumer electronic articles, for example, in conjunction with displays for cell-phones, keyboards, touch screens and other electronic devices such as those capable of wireless communication, music players, notebook computers, mobile devices, game controllers, computer "mice," electronic book readers and the like.

The example pressure-sensing touch system 10 of FIG. 1 includes a transparent sheet 20, with at least one light source 100 and at least one detector 200 disposed adjacent the transparent sheet perimeter as discussed below. One light source 100 and one detector 200 are shown by way of example, with an example light beam (light) 104 from the light source shown traveling over a total-internal reflection (TIR) optical path OP from the light source to the detector. The travel of multiple light beams 104 within transparent sheet 20 as well as in additional waveguides operably arranged on the transparent sheet is discussed in greater detail below.

Multiple light-sources 100 can be used (or equivalently, a light source with multiple light-source elements can be used), and multiple detectors 200 can be used (or equivalently, a detector with multiple detector elements, especially when the location of one or more touch events needs to be determined. In addition, one or more light sources 100 and one or more detectors 200 can be operably disposed to ensure that the entire (or substantially the entire) transparent sheet can be used to sense the pressure of a touch event. This may include, for example, cycling the activation of sets (e.g., pairs) of light sources 100 and detectors 200 to ensure that all possible locations for touch events are covered. In an example, the cycling can be done at a rate that is much faster than the typical duration of a touch event that applies pressure to elicit a response from pressure-sensing touch system 10.

In an alternative example, only a portion of transparent sheet 20 is used to sense a touch event because the travel of light 104 within the transparent sheet body 21 is limited in extent. In such a case, the transparent sheet 20 can include indicia (not shown) directing a user to locate the touch event within a select area where pressure associated with a touch event can be detected.

Light sources 100 and detectors 200 can be coupled directly to the transparent sheet from the edge or bottom as discussed below. Alternatively, light sources 100 and detectors 100 can be optical coupled to transparent sheet 20 using optical means, such as lenses, prisms, gratings, etc., to achieve a desired distribution of light 104 to travel within the transparent sheet. The use of optical means to facilitate optical coupling can be used to increase or optimize the coupling efficiency and increase performance of pressure-sensing touch system 10.

Example detectors 200 include photodiodes and the various types of photosensors. Example light sources 100 include LEDs, laser diodes, optical-fiber-based lasers, extended light sources, and the like.

In example embodiments of the disclosure, an amount of pressure (e.g., a relative amount of pressure) associated with a touch event TE is sensed without regard to the touch event location where the pressure is being applied. Aspects of the disclosure include combining the pressure-sensing touch system of the present disclosure with conventional positional-sensing touch systems, which would allow for determining both the location of a touch event and an amount of pressure associated with the touch event. Other aspects of the disclosure include making absolute pressure measurements using force-sensing devices, as described below. Other embodiments include providing means for touch-event locations, such as the use of an array of waveguides rather than just a single waveguide. Such embodiments are set forth below.

Figure 15A:
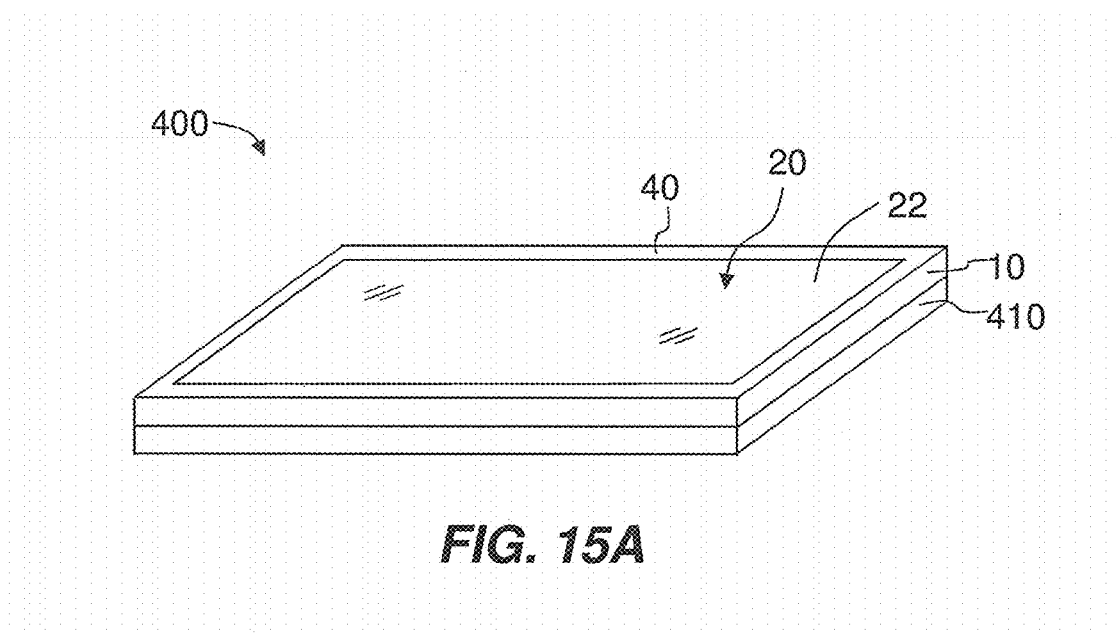
FIGS. 15A through 15C illustrate an example embodiment of a pressure-sensing display device that utilizes the pressure-sensing touch system interfaced with a conventional display unit.
Figure 15B:
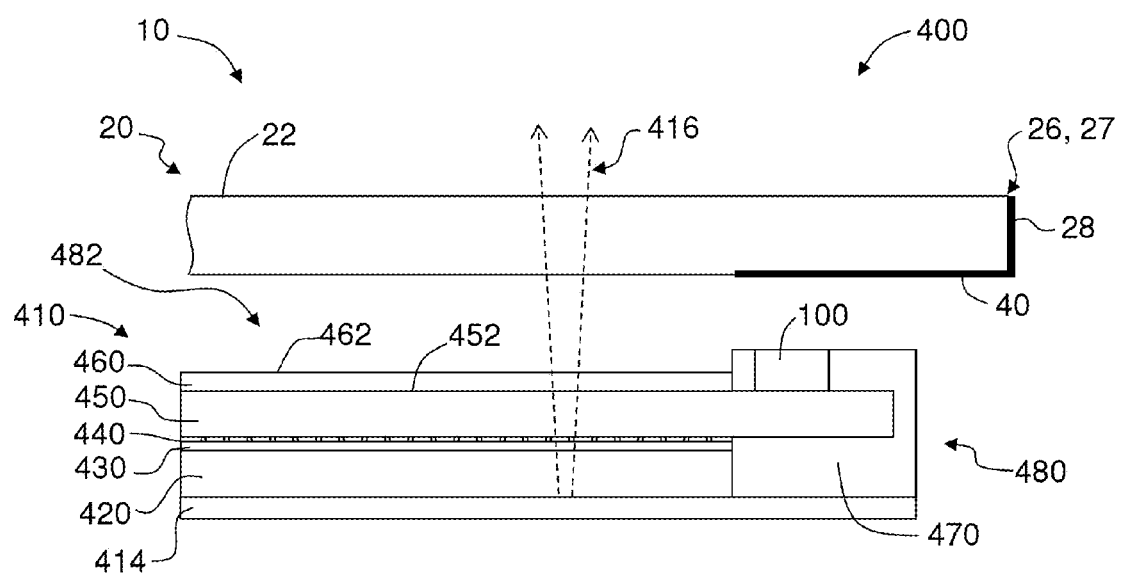
Figure 15C:
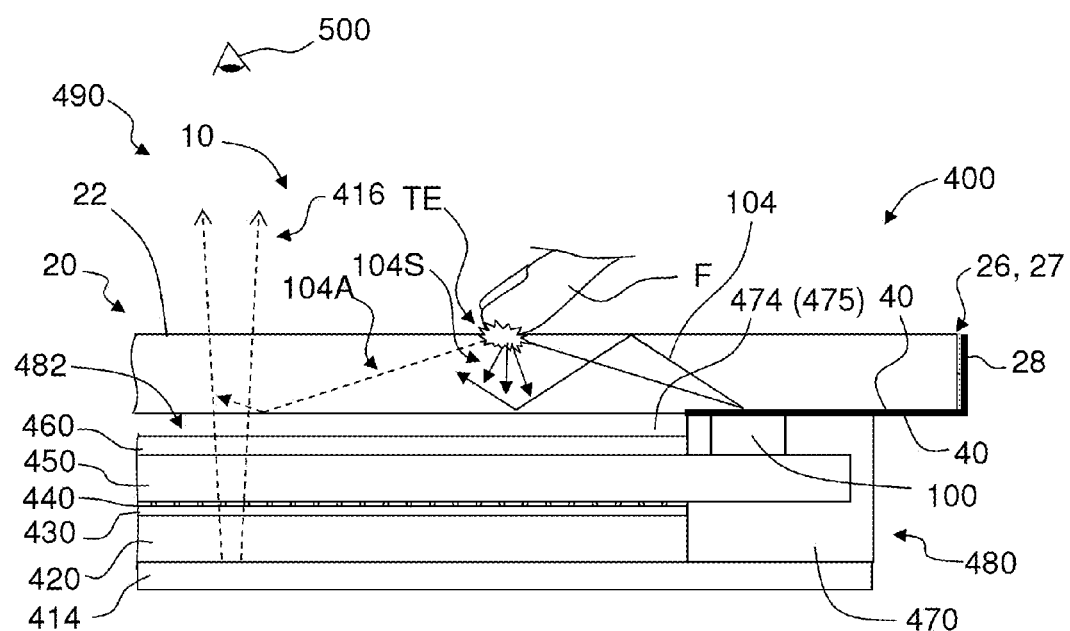

In an example, pressure-sensing touch system 10 includes an optional cover 40 that serves to cover light source 100 and 200 so that they cannot be seen from above (i.e., through top surface 22) by a viewer (see, e.g., viewer 500, FIG. 15C). In an example, cover 40 serves the role of a bezel. In an example, cover 40 can be any type of light-blocking member, film, paint, glass, component, material, texture, structure, etc., that serves to block at least visible light and that is configured to keep some portion of pressure-sensing touch system 10 from being viewed by a user, or that blocks one wavelength of light while transmitting another.

In example embodiments discussed below (see e.g., FIG. 4C), cover 40 can reside anywhere relative to transparent sheet 20 (e.g., bottom surface 24, as introduced and discussed below) that serves to block a viewer from seeing light source 100 or detector 200. Cover 40 need not be contiguous and can be made of sections or segments. Further, cover 40 can be used to shield detector 200 from receiving light other than light 104 from light source 100, such as for sunlight rejection. Thus, in an example, cover can be substantially opaque at one wavelength (e.g., a visible wavelength) and substantially transparent at another wavelength (e.g., an infrared wavelength for light 104 from light source 100).

With continuing reference to FIG. 1, pressure-sensing touch system 10 includes a controller 300 that is operably connected (e.g., via a bus 301) to the one or more light sources 100 and the one or more detectors 200. Controller 300 is configured to control the operation of pressure-sensing touch system 10. The controller 300 includes a processor 302, a device driver 304 and interface circuit 306, all operably arranged.

In an example, controller 300 is or includes a computer and includes a device, for example, a floppy disk drive, CD-ROM drive, DVD drive, magnetic optical disk (MOD) device (not shown), or any other digital device including a network connecting device such as an Ethernet device (not shown) for reading instructions and/or data from a computer-readable medium, such as a floppy disk, a CD-ROM, a DVD, a MOD or another digital source such as a network or the Internet, as well as yet to be developed digital means. The computer executes instructions stored in firmware (not shown).

The computer is programmable to perform functions described herein, including the operation of the pressure-sensing touch system and any signal processing that is required to measure, for example, relative amounts of pressure, as well as the location of a touch event, or multiple touch events and multiple pressures. As used herein, the term computer is not limited to just those integrated circuits referred to in the art as computers, but broadly refers to computers, processors, microcontrollers, microcomputers, programmable logic controllers, application-specific integrated circuits, and other programmable circuits, and these terms are used interchangeably herein.

Software may implement or aid in performing the pressure-sensing functions and operations disclosed herein. The software may be operably installed in controller 300 or processor 302. Software functionalities may involve programming, including executable code, and such functionalities may be used to implement the methods disclosed herein. Such software code is executable by the general-purpose computer or by the processor unit described below.

In operation, the code and possibly the associated data records are stored within a general-purpose computer platform, within the processor unit, or in local memory. At other times, however, the software may be stored at other locations and/or transported for loading into the appropriate general-purpose computer systems. Hence, the embodiments discussed herein involve one or more software products in the form of one or more modules of code carried by at least one machine-readable medium. Execution of such code by a processor of the computer system or by the processor unit enables the platform to implement the catalog and/or software downloading functions, in essentially the manner performed in the embodiments discussed and illustrated herein.

The computer and/or processor as discussed below may each employ a computer-readable medium or machine-readable medium, which refers to any medium that participates in providing instructions to a processor for execution, including for example, determining an amount of pressure associated with a touch event, as explained below. Any memory discussed below constitutes a computer-readable medium. Such a medium may take many forms, including but not limited to, non-volatile media, volatile media, and transmission media. Non-volatile media include, for example, optical or magnetic disks, such as any of the storage devices in any computer(s) operating as one of the server platforms, discussed above. Volatile media include dynamic memory, such as main memory of such a computer platform. Physical transmission media include coaxial cables; copper wire and fiber optics, including the wires that comprise a bus within a computer system.

Common forms of computer-readable media therefore include, for example: a floppy disk, a flexible disk, hard disk, magnetic tape, any other magnetic medium, a CD-ROM, DVD, any other optical medium, less commonly used media such as punch cards, paper tape, any other physical medium with patterns of holes, a RAM, a PROM, and EPROM, a FLASH-EPROM, any other memory chip or cartridge, a carrier wave transporting data or instructions, cables or links transporting such a carrier wave, or any other medium from which a computer can read programming code and/or data. Many of these forms of computer readable media may be involved in carrying one or more sequences of one or more instructions to a processor for execution.

Figure 2:
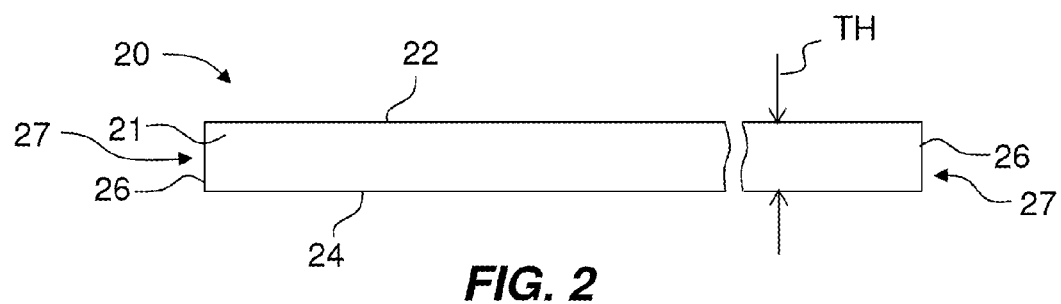
FIG. 2 is a cross-sectional view of the transparent sheet of the pressure-sensing touch system.

FIG. 2 is a cross-sectional view of transparent sheet 20. The transparent sheet 20 includes a bulk portion or body 21, a top surface 22, a bottom surface 24 and at least one edge 26 that defines a perimeter 27. An example transparent sheet 20 is generally rectangular and includes four edges 26, and this example of the transparent sheet is used in the discussion below by way of illustration. Other shapes for transparent sheet 20 may be used, such as circular. Moreover, transparent sheet 20 may be shaped to create a 3D shape in space. For example, it may have downwardly curved edges 26. Edges 26 can be beveled, rounded, tapered or have another shape. In an example, the shape of edge 26 is chosen to reduce or minimize the reflection of light 104 that travels internally within the sheet. In another example, the shape of edge 26 is chosen to increase or maximize the reflection of light 104 that travels internally within the sheet. Perimeter 27 may have any reasonable shape or configuration suitable for the particular application.

Generally, transparent sheet 20 can have any reasonable configuration that allows it to serve as a waveguide for light 104, while also being able to provide a place where a user can apply pressure to elicit a response from pressure-sensing touch system 10.

With reference again also to FIG. 1, transparent sheet 20 has a thickness TH, which is substantially uniform (i.e., top and bottom surfaces 22 and 24 are substantially parallel). In an example, transparent sheet 20 is rectangular and has a dimension (length) LX in the X-direction and a length LY in the Y-direction, and so has four corners defined by four edges 26. Generally, transparent sheet 20 can have a shape wherein edges 26 define multiple corners.

The transparent sheet 20 may generally be made of any suitably transparent material that can be formed into a thin planar sheet, such as plastic, acrylic, glass, etc., and that supports the transmission of light 104 within its body 21 without substantial loss due to scattering or absorption. In an example embodiment, transparent sheet 20 has a thickness TH that allows it to flex without breaking when pressure is locally applied at top surface 22. In another embodiment, the thickness TH is selected to that transparent sheet 20 does not substantially flex when pressure is locally applied at top surface 22. An exemplary range of thickness TH for transparent sheet 20 is from 50 microns to 5 mm. Other thickness can be employed consistent with the particular application for pressure-sensing touch system 10.

In an example embodiment, transparent sheet 20 may be a chemically strengthened glass, such as a soda-lime-type glass. An example glass for transparent sheet 20 is an alkali aluminosilicate glass hardened through ion exchange. These types of glass can comprise $Na_2O$ (soda), CaO (lime) and $SiO_2$ (silica), but can also include oxides such as MgO, $Li_2O$, $K_2O$, ZnO, and $ZrO_2$. Once hardened through ion exchange, these types of glass exhibit certain characteristics that make them desirable for touch screen applications, as well as other applications (e.g., as a cover glass). Further details as to the formulation or production, or both, of soda-lime-type glass suitable for use as transparent sheet 20 may be found in one or more of U.S. patent application Ser. No. 11/888,213 filed Jul. 31, 2007; U.S. patent application Ser. No. 12/537,393 filed Aug. 7, 2009; U.S. patent application Ser. No. 12/545,475 filed Aug. 21, 2009; and U.S. patent application Ser. No. 12/392,577 filed Feb. 25, 2009. An exemplary glass for transparent sheet 20 is Gorilla® glass, from Corning, Inc., Corning, N.Y. Also, an exemplary glass, such as low-iron Gorilla® glass or other low-iron ion-exchanged glass, is transparent to IR-wavelength light 104.

With reference again to FIG. 1, light source 100 is operably disposed adjacent perimeter 27 of transparent sheet 20. In an embodiment, light source emits light 104 at an IR wavelength, such as between 750 nm and 950 nm. In the discussion below, light 104 is also referred to as "light ray" 104 or "light rays" or "light beam" 104 or "light beams" 104 where appropriate.

Figure 3:
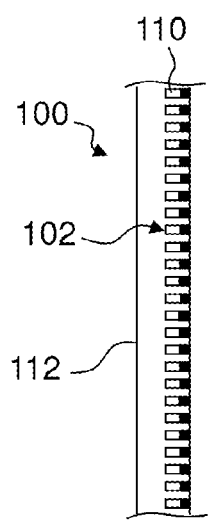
FIG. 3 is a top-down view of an example light source that includes multiple light-source elements.

With reference to FIG. 3, light source 100 can comprise one or more light-source elements 102 that operably mounted on flex-circuit boards ("flex circuits") 110, which in turn are mounted to printed circuit boards (PCB) 112 arranged adjacent an edge 26 of transparent sheet 20. In the discussion herein, light source 100 can thus mean a light source having one or more light-source elements 102. Likewise, detector 200 can include a detector that has one more detector elements (not shown).

In an embodiment, light source 100 is edge-coupled to transparent sheet 20 through edges 26 or through bottom surface 24. Edge coupling is discussed herein by way of example. In other embodiment discussed below, light source 100 and detector 200 are operably arranged at the same edge 26 or same surface 24 of transparent sheet 20.

In the general operation of pressure-sensing touch system 10, processor 302 drives the activation of light-source 100 via a light-source signal SL and also controls the detection of light 104 at detector 200. Detector 200 generates a detector electrical signal SD in response to detecting light 104, wherein the strength of the signal SD is representative of the intensity of the detected light. Portions of interface circuit 306 can be placed near detector 200. For example, preamplifiers and analog-to-digital converters (not shown) may be placed near detector 200 to eliminate noise that may be induced in long wires between processor 302 and the detectors 200, particularly when the processor is centrally located.

In an example, processor 302 controls the light emission and detection process to optimize the detection of light 104, e.g., by providing a characteristic (e.g., a modulation) to the light 104 from the light-source elements 102, or by gating detectors 200 to reduce noise, etc., or both. The modulation may be wavelength modulation or intensity modulation.

Aspects of the disclosure include determining a relative amount of pressure that is applied to upper surface 22 of transparent substrate 20 by a finger, stylus or like implement. In the discussion below, a finger and a stylus with a compressible end are used by way of non-limiting example to describe the pressure-sensing capabilities of pressure-sensing touch system 10. Aspects of the disclosure include detecting respective pressures associated multiple touch events, such as when pressure-sensing touch system 10 is used in forming a pressure-sensing keyboard, as discussed below. It is noted here that the pressure applied to upper surface 20 may be through another surface that resides atop surface 22, such as a coating layer 220, introduced and discussed below.

Figure 4A:
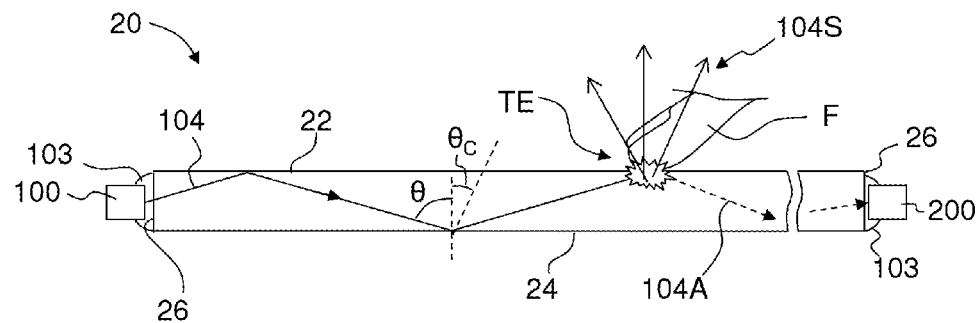
FIGS. 4A through 4C are close-up cross-sectional views of a portion of the pressure-sensing touch system of FIG. 1, illustrating different example embodiments of how the light source can be arranged relative to the transparent sheet to couple light into the transparent sheet, and how a touch event from a finger scatters light at the touch event location.

FIG. 4A is a close-up cross-sectional view of transparent sheet 20, showing an example of how light source 100 and detector 200 are optically coupled to the transparent sheet. In the example of FIG. 4A, light source 100 and detector 200 are edge-coupled to their respective edges 26 using, for example, a glue or adhesive 103, which in an example is index-matched to the transparent sheet to avoid or minimize reflections.

When light source 100 is activated, it emits light 104 (light rays) that travels into body 21 of transparent sheet 20 over a large number of optical paths. The portion of light 104 that has an angle beyond a critical internal reflection angle $\theta_C$ (see FIG. 5) of transparent sheet 20 remains trapped in transparent sheet body 21 via TIR and travels therein. If the travel of internally reflected light 104 remains uninterrupted, it will arrive at detector 200. Thus, transparent sheet 20 acts as an optical waveguide that supports a large number of guided modes, i.e., light rays 104 that travel within the transparent sheet over a wide range of an internal reflection angles $\theta$ beyond critical internal reflection angle $\theta_C$.

Detector 200 is configured to convert the detected light 104 in the aforementioned detector electrical SD, which in an example is a photocurrent. The detector electrical signal SD is then sent to processor 302 for processing, as described below. Such processing is used to extract information relating to changes in the applied pressure at top surface 22 of transparent sheet 20 associated with touch event TE.

Figure 4B:
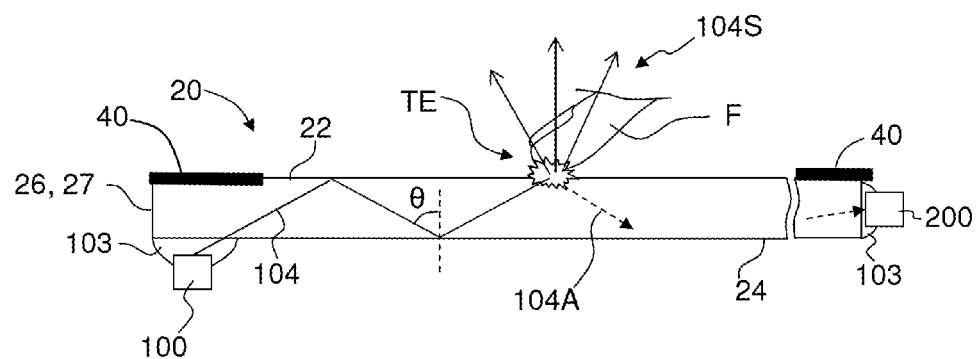

FIG. 4B is similar to FIG. 4A and illustrates an alternative embodiment wherein light source 100 is disposed adjacent bottom surface 24 of transparent sheet 20 and is optically coupled thereto. This face-coupling configuration offers several advantages over the edge-coupling configuration, including simpler manufacturing, no bezel requirement, and potentially increased touch sensitivity. When light 104 is launched into transparent sheet 20, multiple modes propagate at different bounce angles as discussed above in connection with the edge-coupling configuration. The edge-coupling configuration is more likely to generate modes at low bounce angles, while the surface-coupling configuration generates modes at higher bounce angles. Light rays 104 with higher bounce angles provide increased touch sensitivity because they strike top surface 22 more frequently, thereby providing a greater opportunity to interact with a touch event TE.

To keep light-source elements 102 from being seen through transparent sheet 20 by user 500 (see e.g., FIG. 15B), one or more of the aforementioned covers 40 can be employed. In an example, cover 40 is in the form of a film that is opaque at least at visible wavelengths and that optionally transmits at IR wavelengths. An example film for cover comprises a black paint that absorbs light over a wide range of wavelengths including the visible and IR wavelengths. In another example illustrated in FIG. 4C, cover can be disposed between light source 100 and bottom surface 24 of transparent sheet 20, in which case the bezel needs to be substantially transparent to the wavelength of the light-emitting element. In this case, a convenient wavelength of light 104 is an IR wavelength.

Modeling indicates that about 28% of light 104 outputted by light-source element 102 can be trapped within transparent sheet 20 using the face-coupling configuration of FIG. 4B, as compared to about 80% for the edge-coupling configuration of FIG. 4A.

Figure 4C:
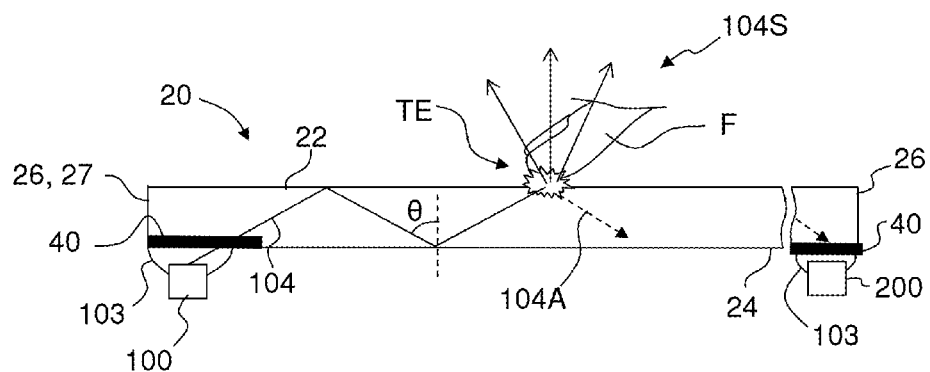

With continuing reference to FIGS. 4A, 4B and 4C, when a touch event TE occurs, such as when a person's finger F touches top surface 22 of transparent sheet 20, it changes the TIR condition of the waveguide as defined by transparent sheet body 21 and top and bottom surfaces 22 and 24. This causes light 104 to be scattered out of transparent sheet body 21 as scattered light 104S at the point (or more accurately, over the area of optical contact) where top surface 22 is touched, thereby attenuating light beam 104 to form an attenuated light beam 104A that continues propagating within body 21 of transparent sheet 20. The touching of top surface 22 is called a touch event TE by an implement such as finger F and its location is referred to herein as the touch-event location.

The intensity of attenuated light beam 104 arriving at detector 200 gives rise to a changed signal strength (e.g., a changed photocurrent) for detector electrical signal SD (as compared to, say, a baseline photocurrent measurement with the original light beam 104), and indicates that a touch event TE has occurred. A threshold value T for the measured detector electrical signal SD can be used to determine whether a touch event TE has occurred.

Figure 5:
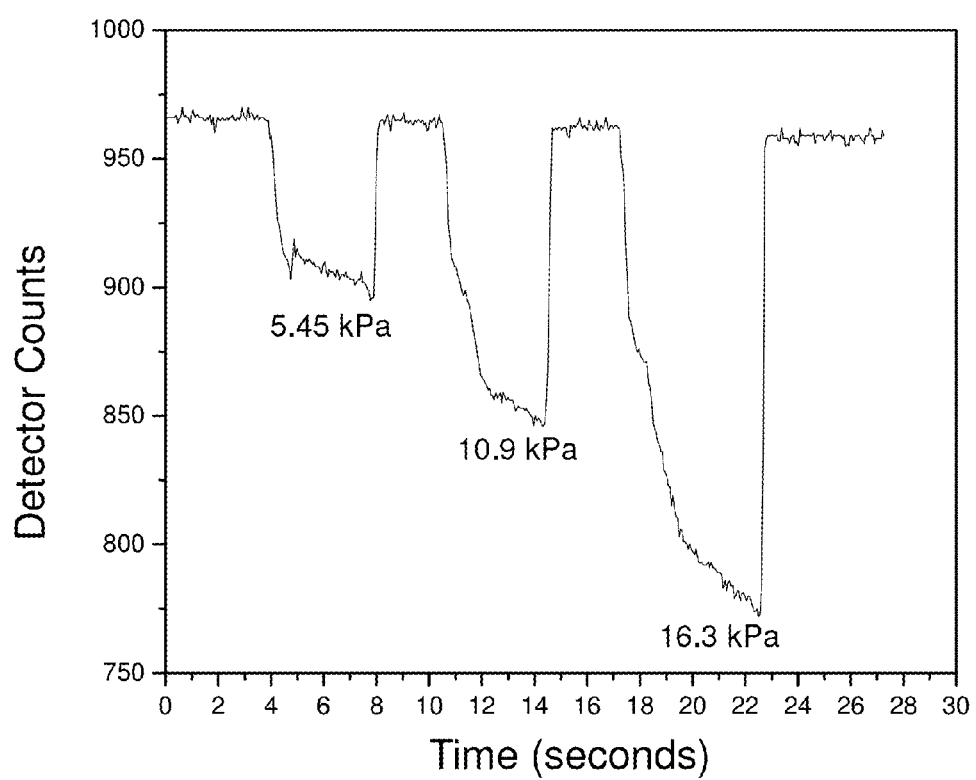
FIG. 5 is a plot of Detector Counts vs. Time (second) showing how touch events of different pressure cause a corresponding change in the detector counts and can be used to sense the relative pressure for a touch event.

The present disclosure includes measuring the amount of attenuation in attenuated light beam 104 and correlating it to an amount of pressure that is associated with touch event TE. FIG. 5 is a plot of the number of counts vs. time (seconds) for a configuration of pressure-sensing touch system 10 similar to that shown in FIG. 1, wherein an eraser was used as the implement for creating touch event TE. The eraser was pressed into top surface 22 with different forces and the resultant pressures (force/area) measured as a function of time. The eraser was lifted from the surface after each application of different pressure, i.e., touch event TE was repeated with different pressures.

As can be seen in FIG. 5, the counts at detector 200 show decreases that corresponds (correlates) to measured pressures of 5.45 kPa, 10.9 kPa and 16.3 kPa. Note that the baseline count returned to a relatively constant value between each touch event. Thus, the measured attenuation (as reflected, for example, as counts with an ADC detector) can be used as measure of the relative pressure being applied by a user when the user creates a touch event TE. When sensing pressure that arises from the touch of finger F, the baseline count may change due to the transfer of oils, moisture, and salt from the finger to top surface 22. This change can be accounted for in software running in controller 300.

Pressure Sensing in Reflective Mode

Figure 6A:
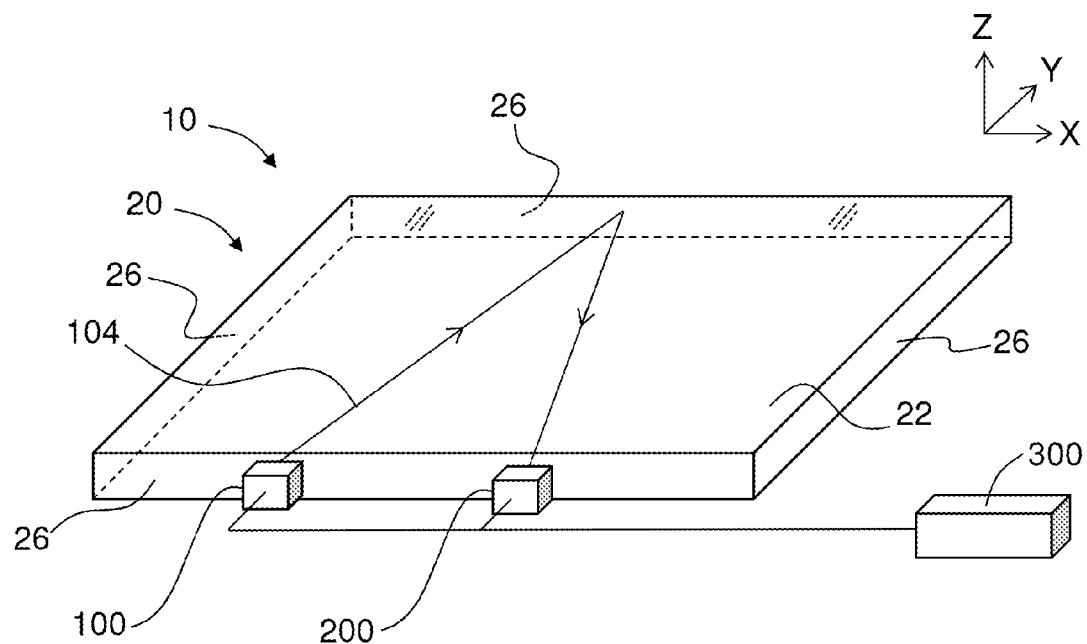
FIGS. 6A and 6B are elevated views of an example pressure-sensing touch system that works in a reflective mode.

FIG. 6A is an elevated view of an example pressure-sensing touch system 10 that illustrates an example embodiment of performing pressure-sensing of touch event TE in a reflective mode. In the configuration of FIG. 6A, both light source 100 and detector 200 are operably arranged at the same side 26 of transparent sheet 20. Light source 100 emits light 104 over a wide range of angles in all directions and will internally reflect off of the other three sides 26 as well as the top and bottom 22 and 24 of transparent sheet 20. In an example, sides 26 and surfaces 22 and 24 are either polished, mirror-coated, or coated with high reflectivity material such that TIR light bounces multiple times, filling body 21 of transparent medium with light 104 traveling over a large number of optical paths. FIG. 6A illustrates one example light ray 104 that reflects from the far side 26 and is received by detector 200.

Figure 6B:
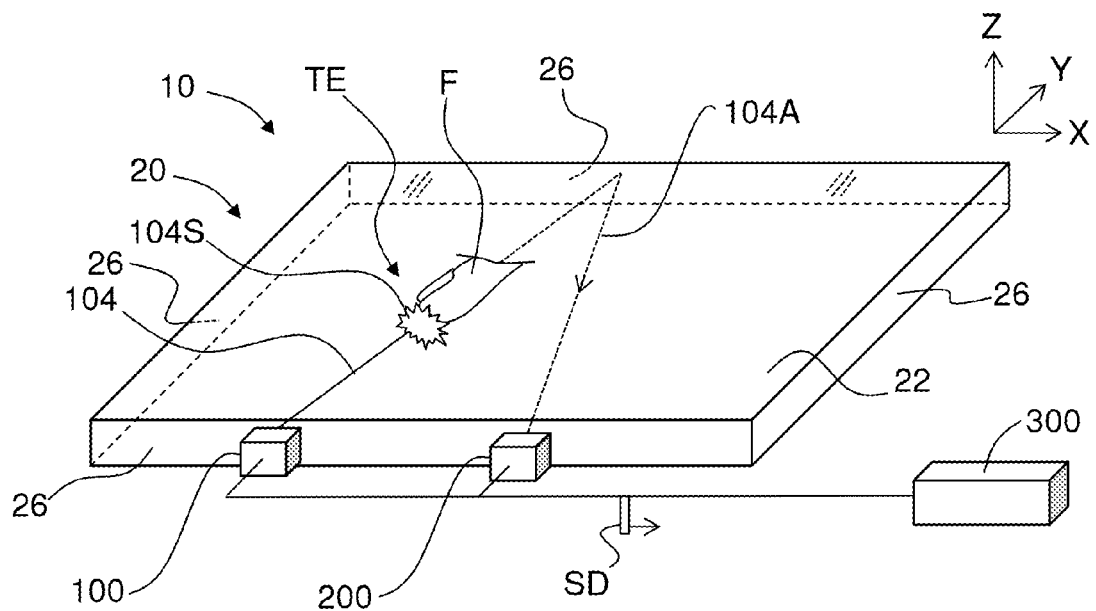

FIG. 6B shows the pressure-sensing touch system 10 of FIG. 1 but in a pressure-sensing state with finger F giving rise to a touch event TE. As described above, the guided light 104 is absorbed and scattered at the location on surface 22 of touch event TE as finger F comes into contact with the top surface. The signal SD as measured by detector 200 depends on the amount of pressure applied by finger F, with the result of the touch being a decrease in photocurrent representative of the reduced intensity of attenuated light beam 104A as compared to the initial (unattenuated) light beam 104.

Pressure Sensing in Scatter Mode

Figure 7A:
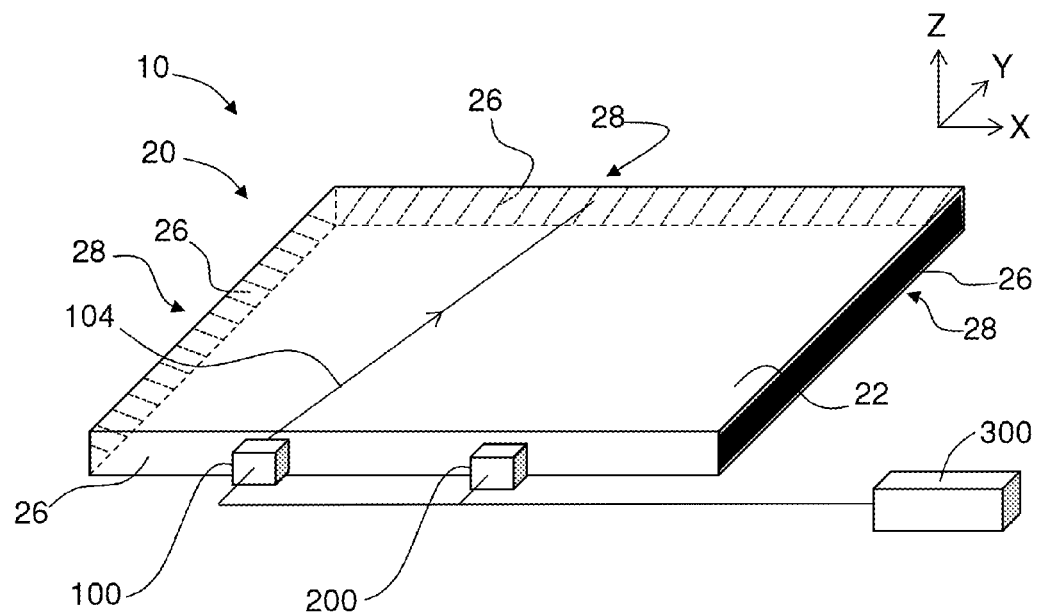
FIGS. 7A and 7B are elevated views of an example pressure-sensing touch system that works in a scattering mode.
Figure 7B:
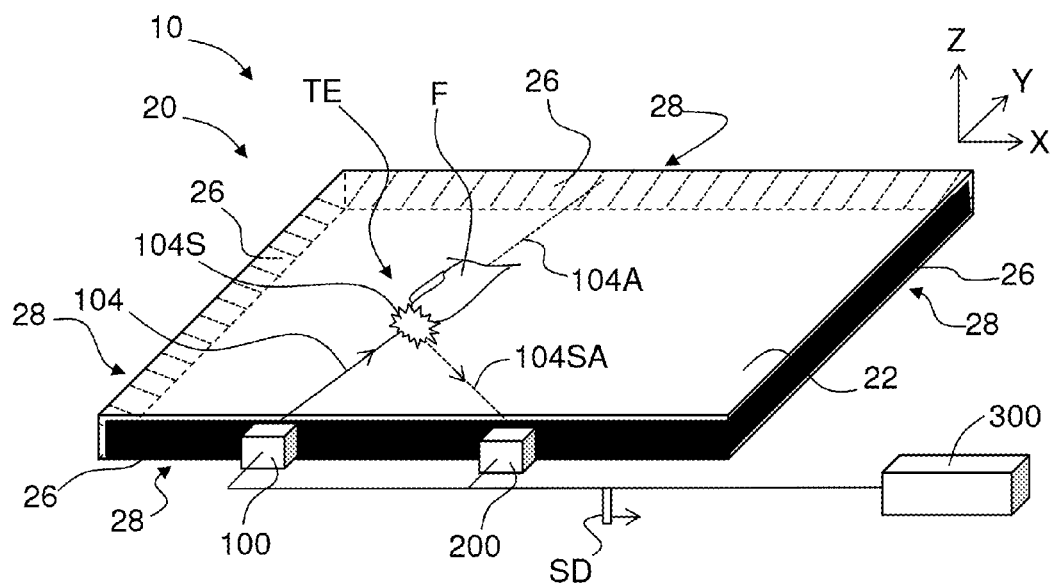

FIGS. 7A and 7B are similar to FIG. 6A and FIG. 6B and illustrate an example embodiment of pressure-sensing touch system 10 wherein the pressure-sensing capability is provided by light scattering rather than by light reflection. With reference to FIG. 7A, sidewalls 26 are made to be substantially absorbing. The sidewalls 26 are shown as being coated with a light-absorbing material 28, except where light source 100 and detector 200 reside.

With reference to FIG. 7B, when a touch event TE occurs, some of the scattered light 104S is scattered toward detector 200 as scattered and attenuated light 104SA. The attenuated light 104A travels along the original path of light 104 and is incident upon sidewall 26, where it is absorbed by absorbing material 28 deposited thereon. In this case, as the pressure of finger F is increased at the location of touch event TE, the amount of scattered light increases, so that the strength of scattered attenuated light 104SA increases. Detector 200 then detects the scattered attenuated light 104SA. This increase in the applied pressure at touch event TE causes a corresponding increase in the amount of scattered attenuated light 104SA, which results in an increase in the photocurrent in the detector electrical signal SD. The detector electrical signal SD is then sent to controller 300 for processing to measure the amount of applied pressure at the location of touch event TE.

FIG. 8A shows images of a finger (top row) and an eraser (bottom row) taken in red light and showing from left to right increasing amounts of pressure being applied to a transparent sheet carrying the red light via TIR. It is observed that increasing amounts of pressure result in an increase in the amount of light scattered out of the top surface of the transparent sheet where the touch event is located. The increase in the amount of scattering is due to the increase in the amount (area) of optical contact, which causes the light traveling in the body of the transparent sheet to interact more and more strongly with the object being pressed into the top surface of the transparent sheet.

FIG. 8B is a series of elevated images of a finger F being applied to the top surface of a transparent sheet with increasing amounts of pressure from left to right. The increasing finger pressure causes an increasing amount of light to be coupled into the finger, as indicated by the increasing brightness of the finger as a function of applied pressure at the touch event location.

Figure 9A:
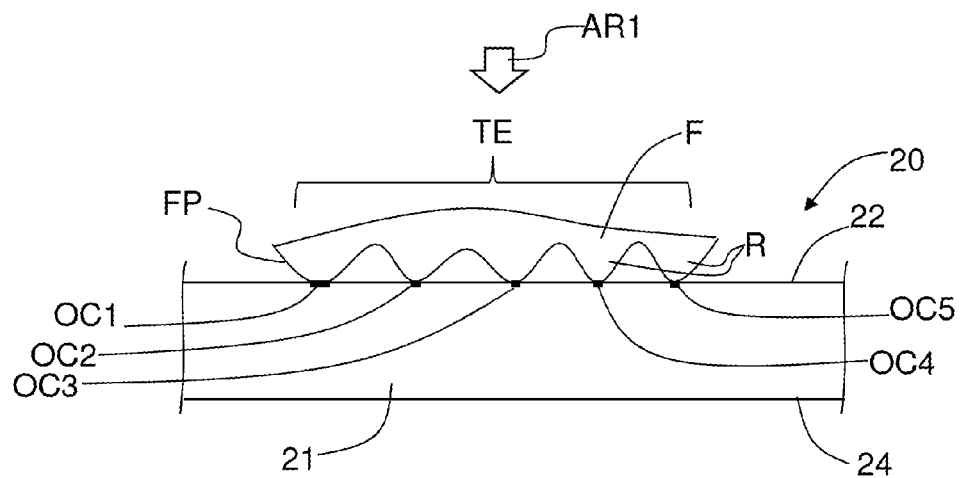
FIGS. 9A through 9C are schematic cross-sectional views of a finger being pressed down onto the top surface of the transparent sheet with increasing amounts of pressure and showing the increasing amounts (areas) of optical contact that the finger makes with the transparent sheet.
Figure 9B:
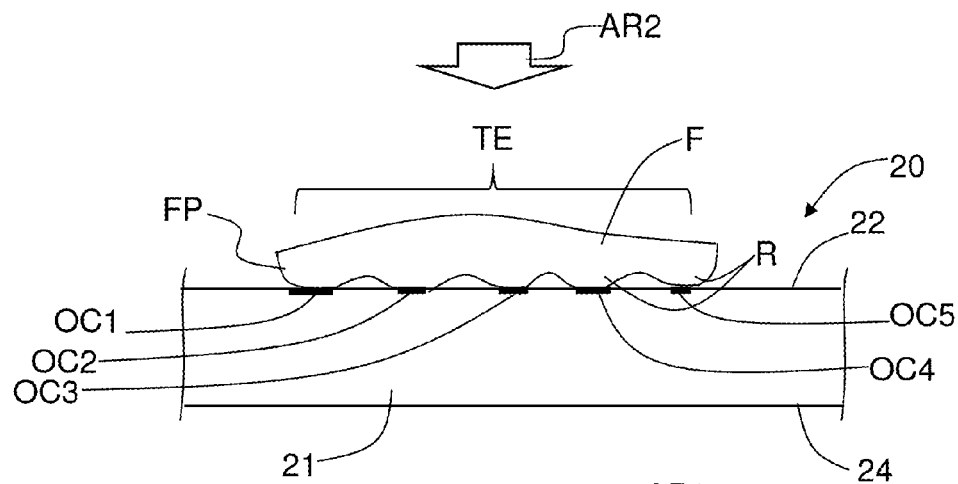
Figure 9C:
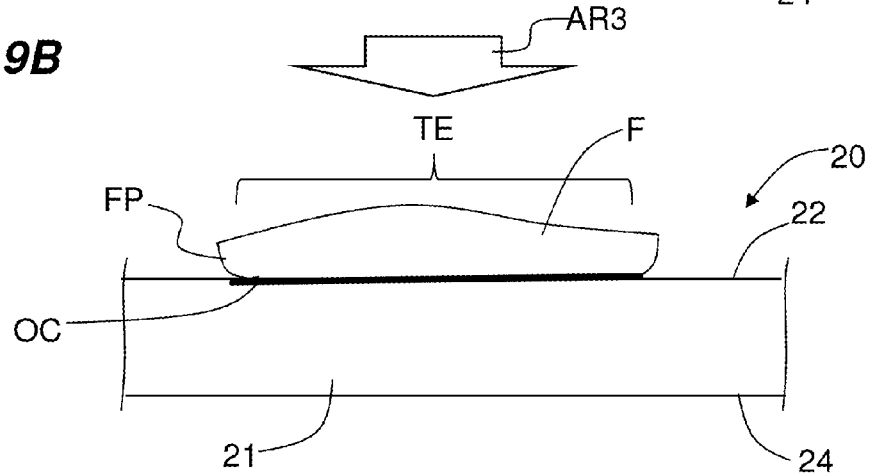

FIGS. 9A through 9C are schematic cross-sectional diagrams that illustrates the phenomenon observed in FIG. 8B. FIG. 9A shows a finger F with fingerprints FP at a touch event TE. For ease of illustration light 104, scattered light 104S and attenuated light 104A is omitted.

In FIG. 9A, finger F is being pressed into top surface 22 with a first amount of force F1 as indicated by arrow AR1. The ridges R that define finger print FP make optical contact with surface 22 at a number of locations denoted OC1 through OC5. These optical contact locations each have a certain surface area associated with them that result in an amount of pressure on surface 22 as defined by the force F1 divided by the surface area associated with optical contact locations OC1 through OC5.

FIG. 9B is essentially the same as FIG. 9A but shows the case where the force of finger F is increases to a second amount of force F2 as indicated by arrow AR2. The additional force causes ridges R to flatten, which increase the amount of optical contact at locations OC1 through OC5. This in turn results in more light being scattered out of body 21 of transparent sheet 20 at the location of touch event TE.

FIG. 9C shows a case where a third amount of force F3 as indicated by arrow AR3 is applied that is sufficiently great to substantially flatten out ridges R so that substantially the entire fingertip makes optical contact OC at the location of touch event TE. This serves to substantially increase the area of optical contact and scatter even more light 104 out of body 21 of transparent sheet 20 at the location of touch event TE.

Surface Roughness

Figure 10:
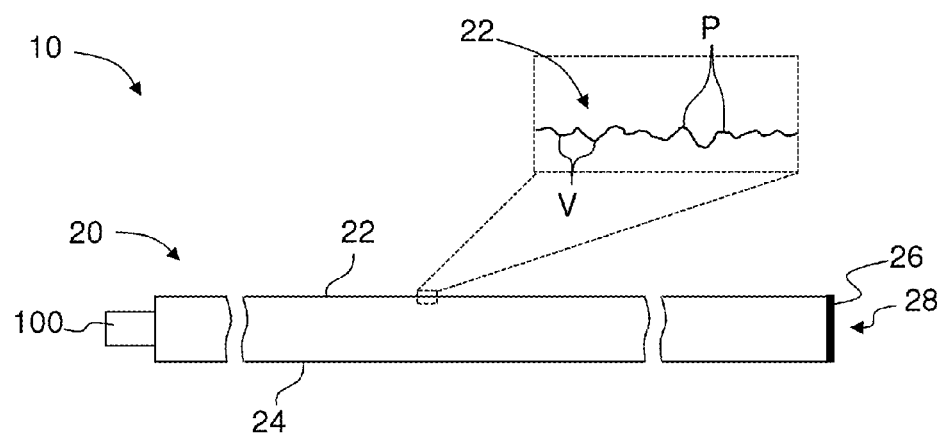
FIG. 10 is a close-up, cross-sectional view of a portion of an example pressure-sensing touch system wherein the top surface of the transparent sheet is a rough surface.

In an example embodiment of pressure-sensing touch system 100 illustrated in FIG. 10, top surface 22 provides an amount of surface roughness, as shown in the close-up inset. For example, if surface 22 has peaks P and valleys V, the range of possible levels of optical coupling via optical contact with a finger or other element used to create a touch event TE can be enhanced. In an example, the scale of the surface roughness is roughly that of fingerprint, e.g., in the range from 100 microns to 300 microns. Here, the roughness scale can be the spacing between peaks and valleys or a root-mean-square (RMS) roughness. In another example, the roughness is between 100 nanometers and 1 mm. Surface 22 can be provided with roughness using a variety of techniques, such as etching, mechanical polishing, embossing, coating with particles, and other known methods. The surface roughness can be random, quasi-random or periodic, nano-featured, micro-featured or textured.

Layered Surface

Figure 11:
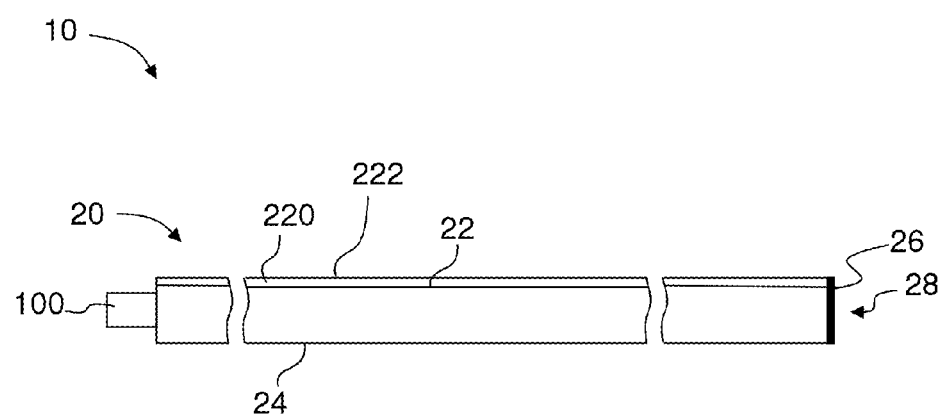
FIG. 11 is a close-up, cross-sectional view of a portion of an example pressure-sensing touch system wherein the top surface of the transparent sheet has one or more layers.

FIG. 11 illustrates an example embodiment where surface 22 of transparent sheet 20 includes one or more layers 220 having a top surface 222. A single layer 220 is shown by way of illustration. Layer 220 can be organic or inorganic. In an example, layer 220 comprises a self-assemble monolayer. An example layer 220 is used to provide a greater amount of hydrophilicity or olephilicity as compared to surface 22. This in turn could affect the amount or range of optical contact that can be made during a touch event, and thus the amount or range of pressure-dependent optical coupling at the touch event location. Other examples of layer 220 include an anti-reflective layer and a light-wavelength blocking layer.

For example, a hydrophobic touch surface 222 would result in lower optical coupling at a touch event location where the touch event is caused by a moist finger being applied to surface 222 at a given pressure. An example material for layer 220 is fluorinated silane, which would make the surface hydrophobic. The material known as E-Z Clean™, available from Corning, Incorporated, can be used to form such a layer 220.

Other materials for layers 220 can be selected to provide anti-fingerprint characteristics.

In an example embodiment, layer 220 can be glass or a high-index epoxy, wherein the index of refraction is selected to prevent substantial light loss as compared to the light loss associated with surface 22 having an air interface.

Modulated Detector Signal

Figure 12A:
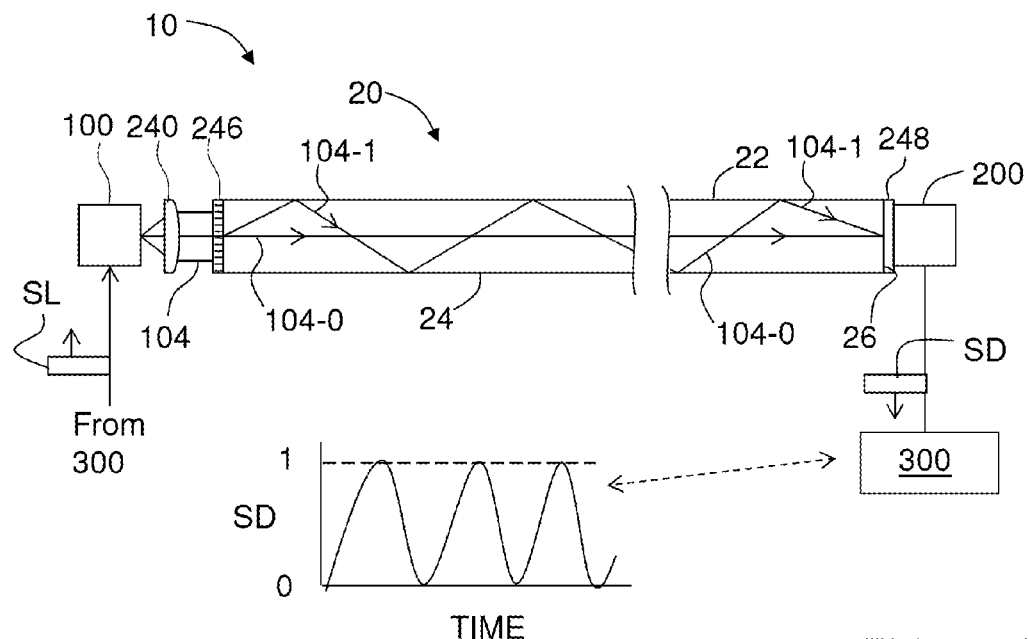
FIGS. 12A, 12B and 13A and 13B illustrate example embodiments of the pressure-sensing touch system that utilizes a modulated detector signal to determine differences in the amount of pressure applied at the touch event location.

FIG. 12A is a close-up view of a portion of an example embodiment of pressure-sensing touch-screen 10 that utilizes a modulated detector signal to determine an amount of pressure associated with a touch event. Pressure-sensing touch-screen 10 of FIG. 12A includes a laser light source 100 (e.g., a distributed Bragg reflector (DBR) laser), a cylindrical lens 240 and a grating 246 arranged adjacent edge 26 of transparent sheet 20, as shown. Detector 200 is shown as arranged adjacent opposite edge 26, with a filter 248 disposed between the edge and the detector to filter out unwanted wavelengths of light, such as visible ambient light, e.g., sunlight.

Laser light source 100 emits light 104 in at least one direction. Cylindrical lens 240 is configured to collimate light 104 so that the light is incident upon grating 246 as collimated light. Grating 246 is configured to split light 104 into two light beams, namely a "zeroeth" light beam 104-0 associated with the zeroeeth diffraction order and a first light beam 104-1 associated with the first diffraction order.

Light source 100 is wavelength modulated via processor 302 of controller 300 via light source control signal SL (see also FIG. 1). Both light beams 104-0 and 104-1 are incident upon detector 200 and interfere to create a sine function that moves due to the wavelength modulation and the different optical paths of the light beams. Thus, the configuration defines an interferometer (e.g., a Michelson interferometer). Detector 200 detects the interfered light beams 104-0 and 104-1 and generates a detector signal SD, which is sent to controller 300 for processing. Detector signal SD is processed (filtered) by controller 300 so that only the light at the laser modulation frequency is detected. This can be accomplished, for example, by a lock-in amplifier.

In the situation of FIG. 12A where there is no touch event TE, both light beams 104-0 and 104-1 arrive at detector 200 with substantially the same intensities, or at the very least, a set difference in their intensities. This defines a modulation in the processed detector signal, as shown in the inset, where the modulation contrast is normalized to 1.

Figure 12B:
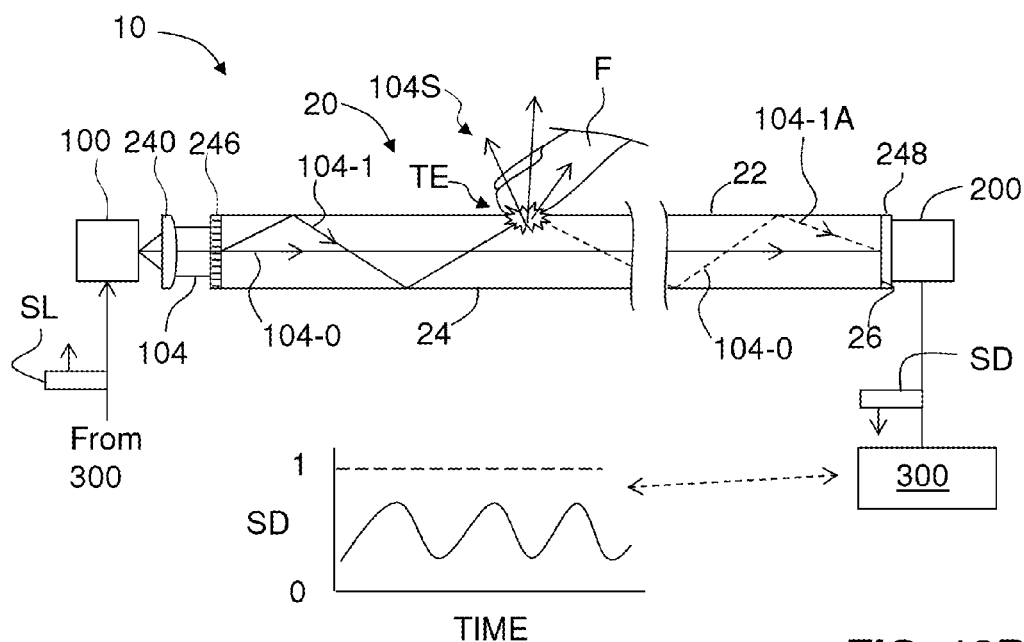

FIG. 12B is similar to FIG. 12A, except that now a finger F is pressing down on surface 22 of transparent sheet 20 to cause a touch event TE. This gives rise to scattered light 104S caused by the optical contact with finger F, which interacts with first light beam 104-1 to form an attenuated first light beam 104-1A that continued on to detector 200. Meanwhile, the zeroeth light beam 104-0 proceeds to detector 200 without being attenuated. Because the first light beam 104-1 has been attenuated to form attenuated light beam 104-1A having less intensity than the original light beam 104-1, the modulation contrast of the processed detector signal SD decreases, as shown in the inset of FIG. 12B. Because the amount of scattered light 104S at the location of touch event TE is a function of the applied pressure thereat, the measured decrease in the modulation contrast is representative of the applied pressure.

Figure 13A:
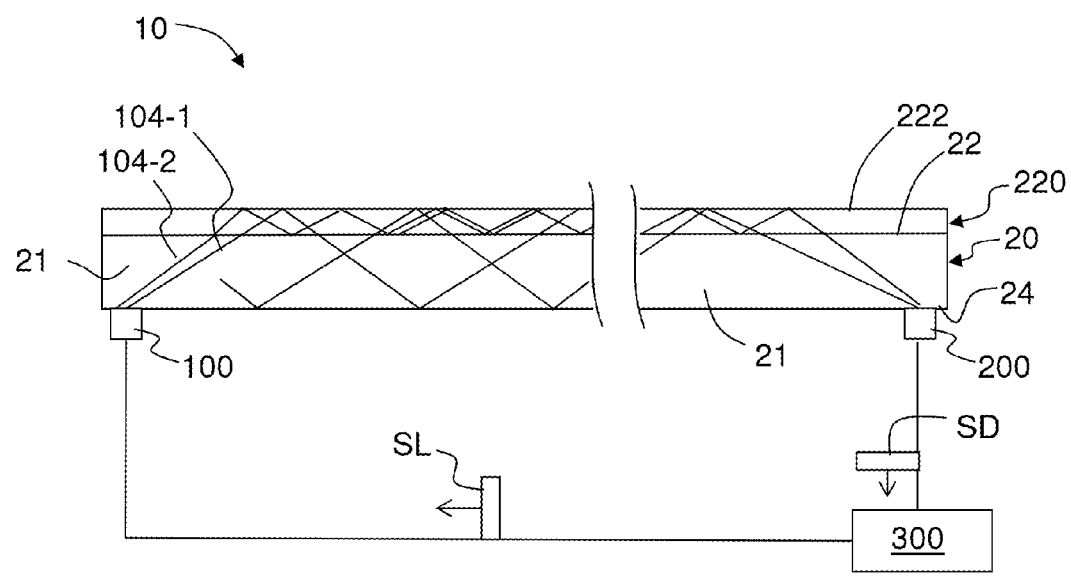

FIG. 13A is a close-up view of a portion of an example embodiment of pressure-sensing touch-screen 10 that includes a layer 220 atop surface 22 of transparent sheet 20. In an example, layer 220 is a graded-index layer formed, for example, by ion exchange in body 21 of transparent sheet 20. Layer 220 may also be layer of constant refractive index wherein the refractive index is higher than that of body 21 of transparent sheet 20 so that the layer serves as a waveguide layer. Thus, the configuration of FIG. 13A includes a surface waveguide associated with layer 220 and a bulk waveguide associated with body 21 of transparent sheet 20. In an example, gratings 246 or other light-coupling elements or features are disposed near source 100 and detector 200 at the interface between body 21 and layer 220 to couple light in an out of layer 220.

Light source 100 and detector 200 are shown operably arranged adjacent bottom surface 24 of transparent sheet 20. Light 104 emitted by light source 100 takes two main optical paths and so is denoted by light 104-1 that travels in both the surface and bulk waveguides and by light 102-2 that mainly travels in the surface waveguide of layer 220. Because the bulk waveguide associated with body 21 of transparent sheet 20 is thicker than the surface waveguide associated with layer 220, light 104-1 will undergo fewer bounces from the uppermost surface 222 than light 104-2. The index difference between the two waveguides will cause different propagation angles, and thus different optical path lengths for 104-1 and 104-2. Different propagation lengths can be generated by both different angles and indices of refraction.

As in the example embodiments described above in connection with FIGS. 12A and 12B, light source 100 is a laser, and the light source is wavelength modulated via light source control signal SL.

The wavelength modulation of light source 100 and the different optical path lengths traveled by light 104-1 and light 104-2 results in interference occurring at detector 200, which gives rise to a modulated detector signal SD. Modulated detector signal SD is processed by controller 300 as described above to extract the modulation contrast in the signal. When there is no touch event, the modulation contrast is at a maximum.

More specifically, the difference of phase $d\varphi$ between the 2 propagating waves is given by $d\varphi = 2\pi L \Delta n/\lambda$, where L is the propagation distance, $\Delta n$ is the difference in the index of refraction between body 21 and layer 220, and $\lambda$ is the wavelength of light 104. This equation for the phase difference assumes that the bulk of the glass that makes up body 21 of transparent sheet 20 is much larger than the surface layer so that the bulk mode is mostly propagating in the bulk as opposed to the surface layer.

By way of example, one can assume a 0.1 meter propagation distance L, an index contrast (difference) $\Delta n = 0.01$ (which is typical of layer 220 being formed in transparent sheet 20 using potassium ion exchange) and using a nominal wavelength $\lambda$ of about 1 micron (such as is generated by an IR DBR lasers), the wavelength modulation amplitude that is required to create a fully modulated signal at the detection is about 1 nm, which is well inside the capability laser light source 100 such as DBR or DFB lasers.

The modulation contrast, the intensity I and the modulation contrast C that are determined from detector electronic signal SD are given by:

$$I = I1 + I2 + 2 \cdot (I1 \cdot I2)^{1/2} \cdot \cos(d\varphi)$$

$$C = 2 \cdot (I1 \cdot I2)^{1/2}/(I1 + I2)$$

If it is assumed that that the optical energy is equally distributed between the two waveguides, then $I1 = I2$ and the contrast C of the signal is close to 100%.

Figure 13B:
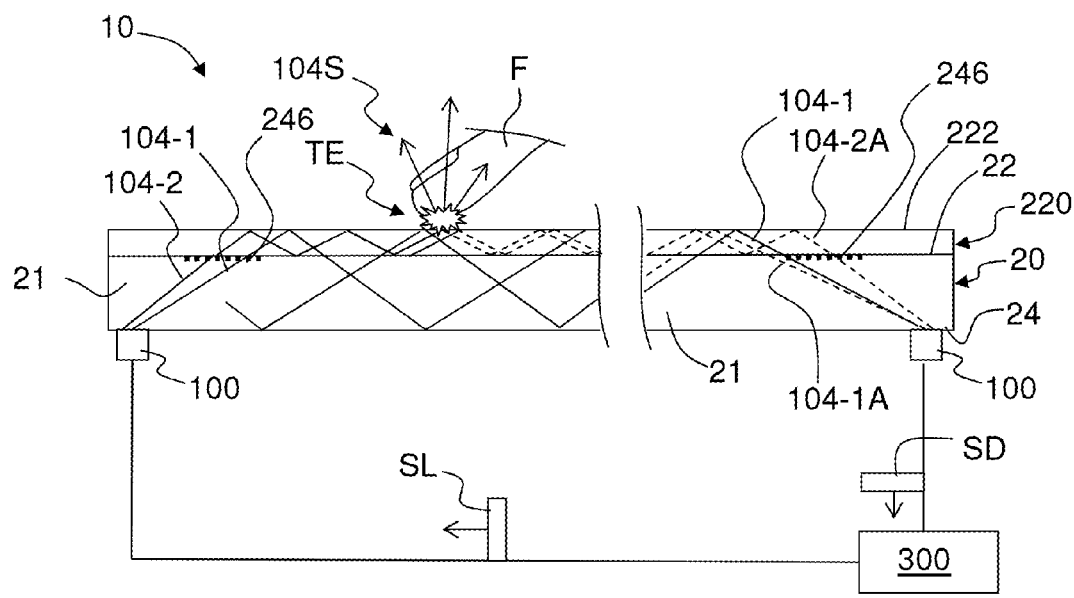

FIG. 13B is the same as FIG. 13A, except that now a finger F is pressing down on surface 222 of layer 220 to cause a touch event TE. This gives rise to scattered light 104S caused by the optical contact with finger F, which interacts with both first and second light beams 104-1 and 104-2 to form scatted light 104S. Because there are more bounces of light 104-2 at surface 222 than for light 104-1, finger F interacts with more light 104-2 than with light 104-1. This is illustrated by the extra light rays for light 104-1 and 104-2. In particular, two light rays 104-2 are shown being attenuated to form attenuated light rays 104-2A, while only a single light ray 104-1 is shown being attenuated to form attenuated light ray 104-1A. As a consequence, there will less light 104-2 reaching detector 200 than light 104-1, thereby reducing the modulation contrast in the processed detector signal SD. Stated differently, the interferometer created by the two-layer structure becomes unbalanced. Because the amount of scattered light 104S at the location of touch event TE is a function of the applied pressure thereat, the measured decrease in the modulation contrast is representative of the applied pressure.

It is worth considering the case where the touch event does not create enough light scattering for the change in the detector electrical signal to calculate a substantial change in modulation contrast. This can be the case when the finger is very dry or when wearing gloves or using a soft stylus.

To detect such low-pressure touch events, one approach is employ a relatively thin (e.g., 0.7 mm or less) transparent sheet 20. This allow for the transparent sheet, as well as for the relatively thin layer 220, to be deformed when subjected to localized pressure, resulting into a different propagation length for the light 104 that propagates close to the surface than the light that propagates in body 21 of transparent sheet 20. This in turn affects the interference of light at detector 200 and thus shows up in detector electrical signal SD.

In an example embodiment, the modulated detector signal methods described above are carried out for a large number of interfering light beams traveling within body 21 of transparent sheet so that the interference pattern at detector 200 is complex and resembles a speckle pattern. Because of the large number of interfering beams, the resulting interference/speckle pattern at detector 200 will be sensitive to scattering of light 104 due to a touch event at top surface 22 of transparent sheet 20. This in turn allows for increased sensitivity in detecting an amount of pressure being exerted at the location of touch event TE.

Figure 13C:
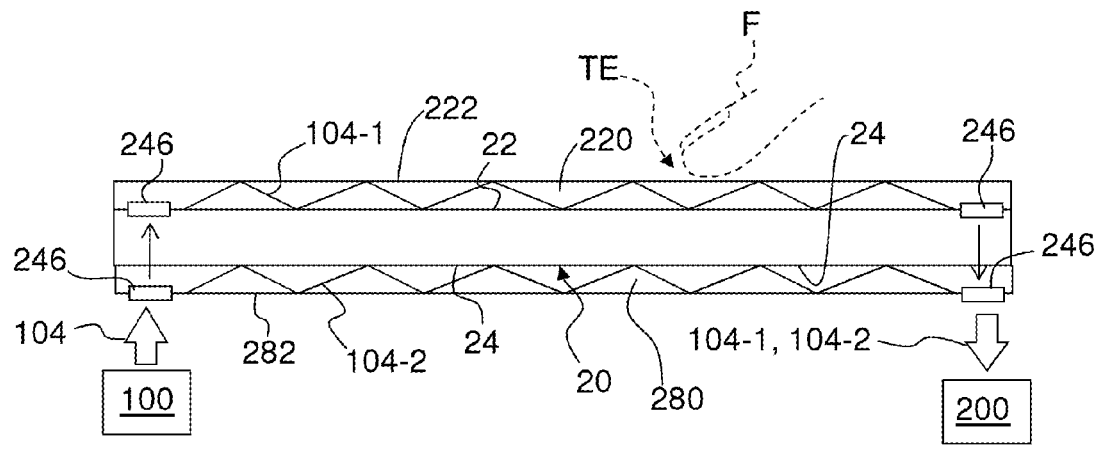
FIGS. 13C and 13D illustrate example embodiments of the pressure-sensing touch system that utilizes waveguides at the top and bottom of the transparent sheet.

FIG. 13C is similar to FIG. 13A and illustrates another example embodiment of pressure-sensing system 10 that additionally includes a second high-index layer 280 on the bottom surface 24 of transparent sheet 20. Layer 280 servers as a second relatively thin waveguide. Gratings 246 or other light-coupling elements are disposed relative to light source 100 and detector 200 to couple light 104 into layers 220 and 280 as light 104-1 and 104-2, respectively.

When a touch event TE arises that applies localized pressure at top surface 222, the structure made of transparent sheet 20 and layers 220 and 280 deforms. This in turn causes the optical path length of light 104-1 traveling in layer (waveguide) 220 to change relative to the optical path length of light 104-2 traveling in layer (waveguide) 280. The change in optical path lengths changes the interference at detector 200 in a manner representative of the pressure being applied at the location of touch event TE (shown in phantom with finger F in in FIG. 13C).

In one example, the layered configuration of FIG. 13C can be formed using ion exchange (e.g., silver ion exchange) through both top and bottom surfaces 22 and 24 of transparent sheet 20. It is noted that silver ion exchange not only can provide a suitable index change but also may provide the structure with anti-bacterial properties. In another example, the layered configuration of FIG. 13C is formed a coliminate glass structure, where transparent sheet 20 has an index of refraction lower than layers 220 and 280 so that the two outer layers serve as relatively thin waveguides.

As discussed above, in an example embodiment of pressure-sensing system 10, light source 100 is utilized in combination with optical elements that serve to shape light beam 104. An example of such a configuration that utilizes a cylindrical lens 240 and a grating 246 is shown in FIGS. 12A and 12B.

Figure 13D:
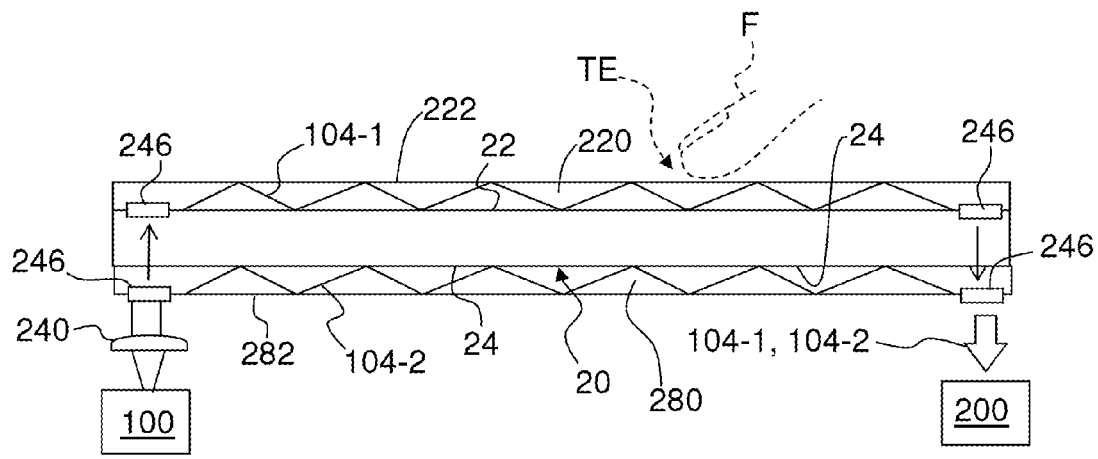
Figure 13E:
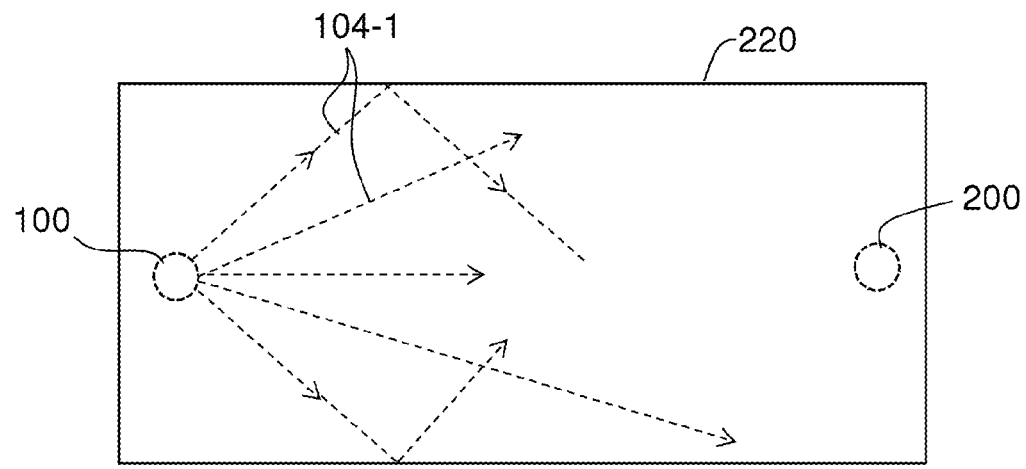
FIG. 13E is top-down view of the waveguide structure shown in FIG. 13D, illustrating how light diverges within the top layer in the direction orthogonal to the propagation of light within the layer.

FIG. 13D and FIG. 13E (top-down view) illustrate an example embodiment based on the multilayer configuration of FIG. 13C, wherein a cylindrical lens 240 is used to collimate light beam 104 so that the light beam can spread in the orthogonal direction. This configuration allows for exciting only a single mode of the waveguides 220 and 280 in the direction of light propagation while allowing the light to diverge in the orthogonal direction to substantially fill the entirety of the waveguides with light. As discussed above, more than one light source 100 may be require to fill the entire volumes of waveguides 220 and 280 with light 104-1 and 104-2, respectively.

In an example embodiment, rather using a light source 100 having multiple light-source elements 102 (see FIG. 3), in an example the light source can be an extended light source that, for example, includes a light-diffusing optical fiber. In such an embodiment, the cylindrical lens 240 can extend the length of the extended source, with the extended light source being arranged substantially at the focal position of the cylindrical lens.

Figure 13F:
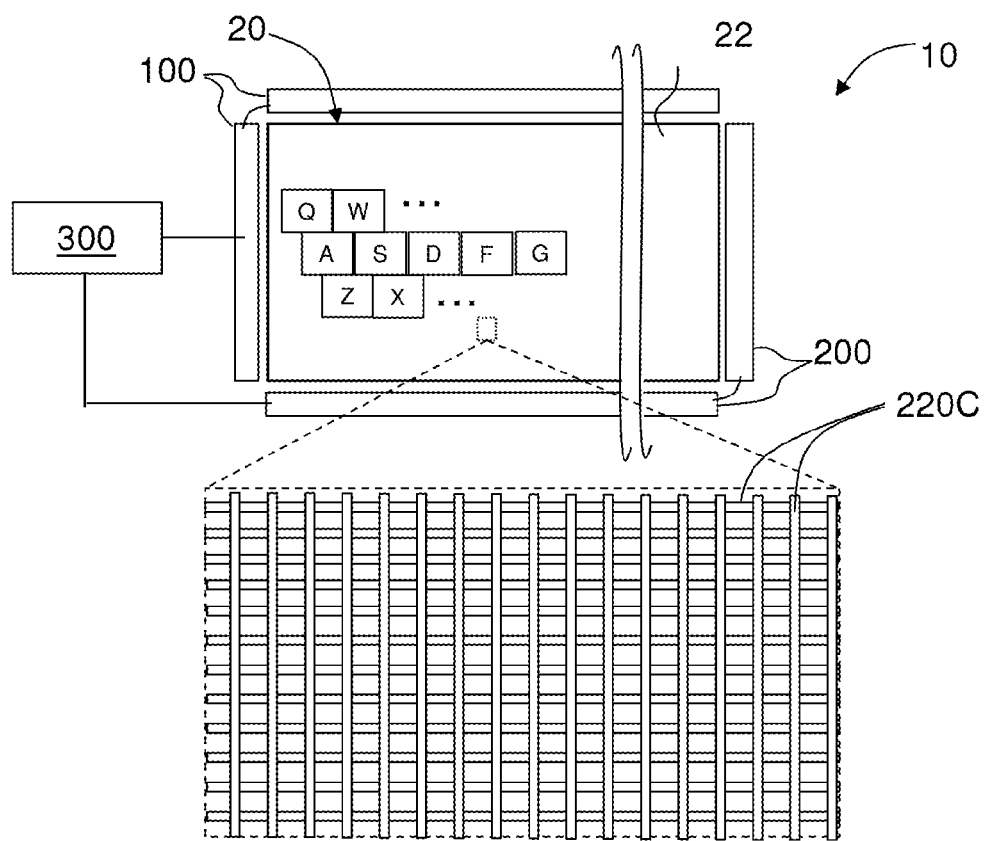
FIG. 13F is an example embodiment of the pressure-sensing touch system wherein an array of channel waveguides is disposed on the top surface of transparent sheet, and wherein the system is configured by way of example as a keyboard that responds to pressure applied at select locations on the transparent sheet.

In an example embodiment, rather than layer 220 being a single slab waveguide, a number of channel waveguides 220C running in the (x,y) directions can be deployed, as illustrated in the schematic diagram of pressure-sensing system 10 of FIG. 13F, which is shown configured as a keyboard device by way of example. The channel waveguides 220C can be thin-film based or formed by ion-exchange. Further in the example embodiment, detector 200 can be configured with detector elements arranged to receive light 104 from the individual channel waveguides.

Such a configuration can be used to determine the (x,y) location of a touch event, along with an amount of pressure being applied at the touch location of a touch event TE. It also enables determining the locations and pressures of two or more simultaneous touch events TE. This capability is useful for applications such as the keyboard application illustrated in FIG. 13F or other applications where simultaneous touch events could be used. The channel waveguides 220C can have a variety of different sizes to match the particular application. For example, for a keyboard application, one or perhaps a few waveguides per key would be required, though tens or many tens or even hundreds of waveguides could also be used per key to obtain oversampling/redundancy of the pressure measurement at the touch event location corresponding to a key stroke.

Light Sources

Example light sources 100 were discussed above, and included light-emitting diodes, laser diodes, fiber lasers, as well as extended sources that include for example light-diffusing optical fiber.

In an example embodiment, light source 100 is a laser that has three main characteristics: a) single mode, 2) a tunable wavelength by up to 1 nm, and 3) relatively inexpensive.

One type of light source that includes these characteristics is the aforementioned DBR laser. A particularly suitable DBR laser light source 100 is one that operates at 1060 nm. Such lasers have three main sections: a gain section, a grating section (also the DBR section) that includes a Bragg grating, and a phase section in between the gain and grating sections. Bragg grating that provides wavelength dependent reflectivity and allows for selecting a central wavelength of the laser by applying the appropriate signals. The phase section is used to adjust the wavelength of the selected mode.

Thus, in a DBR laser, the wavelength can be modulated by applying a signal to either the phase section or to the DBR section. However, if the signal is applied to only one of the two sections, the wavelength will experience abrupt wavelength jumps instead of smooth and continuous wavelength variations. However, by applying specific signals to both the DBR section and the phase section, continuous wavelength tuning with mode hops can be obtained. Thus, in example embodiment, light source 100 is configured as a DBR laser wherein the wavelength is continuously tunable without mode hops.

Pressure Sensing Calibration

Aspects of the disclosure include methods of pressure-sensing calibration and force measurements to facilitate developing algorithms for sensing, reporting, and response to various implements used for creating a touch event, such as a finger, a pencil, a stylus, a pen, etc. In an example embodiment, strain-sensing or force-sensing devices (e.g., strain gauges, piezo-electric devices) are used to measure force or pressure associated with a touch event recorded by pressure-sensing touch system 10, and optionally provide haptic feedback.

Figure 14A:
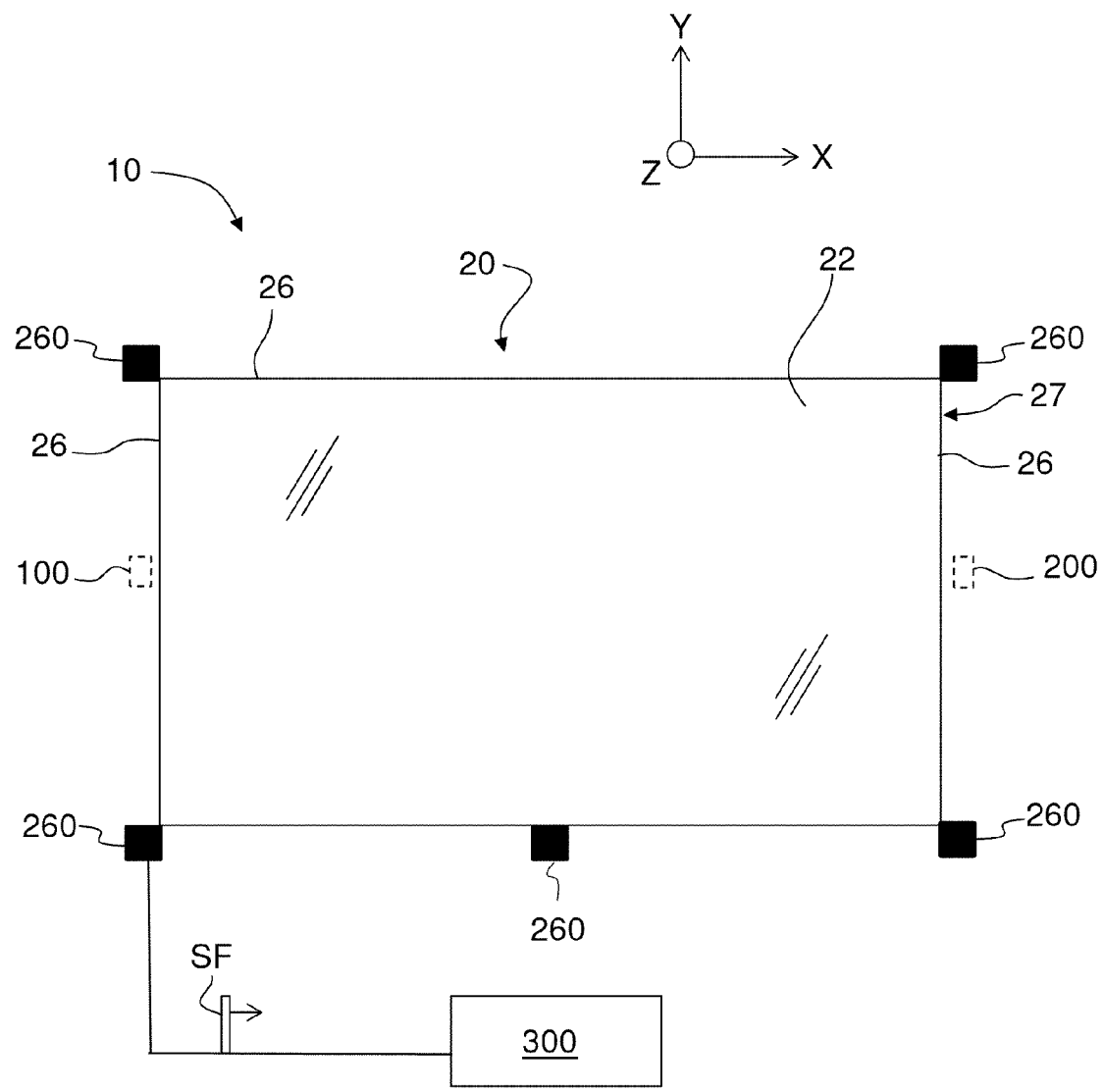
FIGS. 14A and 14B illustrate different example embodiments wherein force-sensing devices are used to measure an amount of force being applied to the top surface of the transparent sheet of the pressure-sensing touch system.

FIG. 14A is a plan view of a portion of pressure-sensing touch-screen 10 that includes a number of force-sensing devices 260 that are configured such that transparent sheet 20 is suspended by the force-sensing devices so that movement is confined to a single axis, such as the Z-axis as shown. Force-sensing devices 260 can be located along edges 26 or at the corners, or at a combination of such locations, as shown in FIG. 14A. Thus, when a touch event occurs such as described above, the amount of force associated with the touch event is measured by force-sensing devices 260, which in an example are electrically connected to controller 300 and provide force-sensing signals SF thereto for processing. One such electrical connection and corresponding signal SF is shown by way of illustration.

Figure 14B:
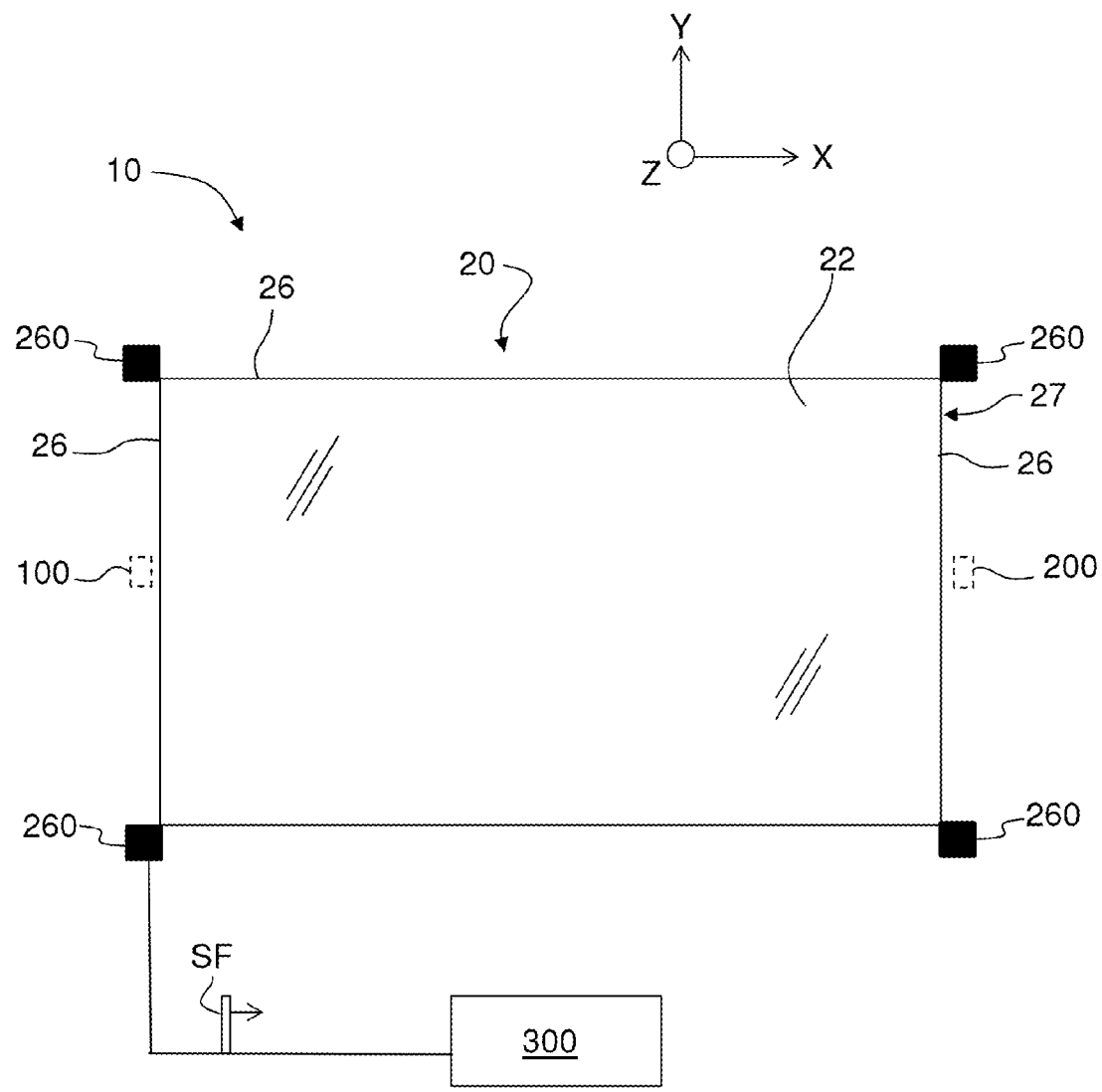

FIG. 14B is similar to FIG. 14A but has a force-sensing device configuration that allows for the force to be detected in more than one axis. This multidimensional force sensing method can be useful in advance control applications such as games, medical devices, industrial device, etc.

Force-sensing devices 260 can be or include any of the known and commercially available force-sensing devices. These include, for example, a) force-sensing resistors, which are small and flexible and are thus easily incorporated into pressure-sensing touch system 10; b) piezo-electric-based force-sensing devices that translate a mechanical deformation into a measurable electric charge; c) strain gauges based on electric circuits; d) optical strain gauges, such as fiber-optic-based strain gauges; e) capacitive strain gauges; and f) accelerometer-based force sensors.

An aspect of the disclosure includes using one or more force-sensing devices to characterize the amount of force applied at a touch event to provide an absolute measurement of either the applied force or the applied pressure at the touch event. The force measurement information can be stored in controller 300 and then used to characterize the nature of a given touch event based on the amount of force or pressure that is optically detected based on the methods described above.

Pressure-Sensing Display System

Pressure-sensing touch system 10 can be used in combination with conventional position-sensing display systems, such as those that are capacitive-based and resistive-based.

FIG. 15A is a schematic elevated view of an example touch-sensitive display 400 formed by operably arranging pressure-sensing touch system 10 adjacent and above (e.g., atop) a conventional display unit 410, such as a liquid crystal display, which display may have conventional position-based sensing capability.

FIG. 15B is a schematic cross-sectional, partial exploded view of an example touch-sensitive display 400 illustrating an example of how to integrate pressure-sensing touch system 10 with conventional display unit 410. The conventional display unit 410 is shown in the form of a liquid crystal display that includes a backlighting unit 414 that emits light 416, a thin-film transistor (TFT) glass layer 420, a liquid crystal layer 430, a color filter glass layer 450 with a top surface 452, and a top polarizer layer 460 with a top surface 462, all arranged as shown. A frame 470 is disposed around the edge of color filter glass layer 450. Light source 100 is shown by way of example as being operably supported within frame 470. This forms an integrated display assembly 480 having a top side 482.

With reference now to FIG. 15C, to form the final touch-sensitive display 400 having pressure-sensing capability, transparent sheet 20 is added to integrated display assembly 480 of conventional display unit 410 by operably disposing the transparent sheet on top side 482 of the assembly. The transparent sheet 20 includes the aforementioned cover 40 in the form of an IR-transparent but visibly opaque layer disposed adjacent light source 100. An absorbing layer 28 can also be included at edge 26 of transparent sheet 20 to prevent light 104 from reflecting off the edges of the transparent sheet.

In the embodiment of touch-sensitive display 400 of FIGS. 15B and 15C, light source 100 face-coupled to bottom 24 of transparent sheet 20 through the aforementioned IR-transparent cover 40. There is also an optional air gap 474 formed between transparent sheet 20 and top polarizer layer 460. In an example embodiment, air gap 474 can be replaced with a low-index layer 475 that can contact the top polarizing layer 460, or whichever surface transparent sheet 20 may need to rest upon. Low-index layer 475 serves to preserve the waveguiding properties of transparent sheet 20 when the transparent sheet need to be placed in contact with a surface, especially one that has a higher index of refraction than the transparent sheet. In an example, the low-index layer 475 is made of a bonding material that is used to bond transparent sheet to an underlying surface.

In an example, various indicia or indicium (not shown) may be presented to user 500 on or through transparent sheet 20 to guide the user to interact with pressure-sensing touch system 10. By way of example, the indicium may include areas on top surface 22 of transparent sheet 20 that are set aside for indicating user choices, software execution, etc., or to indicate a region where the user should create touch event TE. Such region, for example, might be required where light 104 does not reach certain portions of top surface 22.

Although the embodiments herein have been described with reference to particular aspects and features, it is to be understood that these embodiments are merely illustrative of desired principles and applications. It is therefore to be understood that numerous modifications may be made to the illustrative embodiments and that other arrangements may be devised without departing from the spirit and scope of the appended claims.

What is claimed is:

1. A pressure-sensing touch system for sensing an amount of pressure at a touch location of a touch event caused by a finger having a fingerprint, comprising:
    a single-layer transparent sheet having a monolithic body with a top surface, a bottom surface, and a perimeter that includes first and second edges, wherein the touch event occurs directly on the top surface at a touch event location, with the top surface having a surface roughness in the range from 100 microns to 300 microns either peak-to-valley or root mean square to enhance an optical contact between the fingerprint and the top surface;
    at least one light source operably arranged either at the first edge or at the bottom surface adjacent the first edge of the single-layer transparent sheet and that emits light that is coupled into the single-layer transparent sheet so that the light travels only within the monolithic body of the single-layer transparent sheet via total internal reflection from the top and bottom surfaces only until the touch event and the optical contact between the fingerprint and the top surface at the touch event location causes a portion of the light to be scattered out of the single-layer transparent sheet, thereby defining an attenuated light beam that travels only within the monolithic body of the single-layer transparent sheet; and
    at least one detector operably disposed either at the first edge, at the second edge or at the bottom surface adjacent the second edge of the single-layer transparent sheet to generate a detector electrical signal having a signal strength representative of a detected intensity of the attenuated light beam traveling only within the single-layer transparent sheet and that is incident upon the at least one detector, wherein the optical contact of the touch event causes a change in the detected light intensity that corresponds to a change in pressure applied at the touch event location.

2. The system according to claim 1, further comprising a controller operably coupled to the at least one light source and the at least one detector and configured to receive the detector electrical signal and determine the change in the pressure applied at the touch event location.

3. The system according to claim 2, further comprising the light source being wavelength modulated to form intensity modulated light at the detector.

4. The system according to claim 3, wherein the detector electrical signal is processed by the controller to determine a modulation contrast representative of the change in pressure applied at the touch event location.

5. The system according to claim 1, wherein the single-layer transparent sheet is substantially transparent to infrared (IR) light, wherein the emitted light from the at least one light sources comprises IR light, and wherein the at least one detector is configured to detect the IR light.

6. The system according to claim 1, wherein the surface roughness of the top surface is random, quasi-random or periodic.

7. The system according to claim 1, wherein the surface roughness of the top surface is textured.

8. The system according to claim 1, further comprising at least one force-sensing device operably arranged relative to the single-layer transparent sheet to measure an amount of force associated with the touch event.

9. The system according to claim 8, wherein the system includes a controller operably coupled to the at least one force-sensing device and that is configured to convert the measured amount of force to a pressure associated with the touch event.

10. The system of claim 8, wherein the at least one force-sensing device is one selected from the group of force-sensing devices comprising: a force-sensing resistor, a piezo-electric-based force-sensing device, a strain gauge based on an electric circuit, an optical strain gauge, a capacitive strain gauges, and an accelerometer-based force sensor.

11. A display system that has pressure-sensing capability, comprising:
    the pressure-sensing touch-screen according to claim 1; and
    a display unit having a display, with the pressure-sensing touch-screen operably arranged adjacent the display.

12. A method of determining a relative amount of pressure applied by a finger having a fingerprint applied at a location of a touch event directly on a top surface of a single-layer transparent sheet having a monolithic body with first and second edges and a bottom surface, comprising:
    sending light from at least one light source through the monolithic body of the single-layer transparent sheet by total-internal reflection from the top and bottom surface only, with the top having a surface roughness in the range from 100 microns to 300 microns either peak-to-valley or root mean square to enhance an optical contact between the fingerprint and the top surface, and wherein the light source is arranged either at the first edge or at the bottom surface adjacent the first edge, wherein the light travels only through the monolithic body of the single-layer transparent sheet until the location of the touch event;

scattering a portion of the light out of the single-layer transparent sheet by the optical contact between the fingerprint and the top surface, wherein the scattering is in proportion to the relative amount of pressure applied by the fingerprint at the touch location to define an attenuated light beam that travels only within the monolithic body of the single-layer transparent sheet;

detecting the attenuated light beam with at least one detector arranged either at the first edge, at the second edge, or at the bottom surface adjacent the second edge, and generating a first detector electrical signal; and determining from the first detector electrical signal the amount of pressure applied by the implement at the location of the touch event.

13. The method according to claim 12, wherein the surface roughness is random, quasi-random or periodic.

14. The method according to claim 12, further comprising measuring a baseline detector electrical signal in the absence of a touch event and comparing the first detector electrical signal to the baseline detector electrical signal to determine the amount of pressure applied by the implement at the location of the touch event.

15. The method of claim 12, wherein the light has a wavelength and further comprising:
modulating the wavelength of the light;
passing the wavelength-modulated light through a grating to divide the light incident upon the grating into first and second light beams;
detecting the first and second light beams so that the first detector electrical signal includes intensity modulation information;
processing the first detector electrical signal to determine a modulation contrast representative of the relative amount of pressure applied by the implement at the location of the touch event.

16. The method of claim 12, further comprising measuring a force exerted by the implement at the touch event location using one or more force-sensing devices operably arranged relative to the single-layer transparent sheet.

17. The method of claim 12, wherein the surface roughness is textured.

18. The method of claim 12, wherein the contact area of the touch event has a size defined by the amount of applied pressure of the fingerprint on the top surface of the single-layer transparent sheet, and wherein the detected attenuated light beam has an amount of attenuation in proportion to the size of the contact area of the touch event.

19. The method of claim 12, comprising disposing the at least one light source and the at least one detector at different ones of the first and second edges of the single-layer transparent sheet.

* * * * *

UNITED STATES PATENT AND TRADEMARK OFFICE
CERTIFICATE OF CORRECTION

PATENT NO. : 9,880,653 B2
APPLICATION NO. : 13/826110
DATED : January 30, 2018
INVENTOR(S) : Izhak Baharv et al.

Page 1 of 1

It is certified that error appears in the above-identified patent and that said Letters Patent is hereby corrected as shown below:

On the Title Page

On page 2, Column 1, item (56), U.S. Patent Documents, Line 23, delete "Eliasson" and insert -- Eliasson et al. --, therefor.

In the Claims

In Column 20, Line 22, Claim 3, delete "according," and insert -- according --, therefor.

In Column 22, Line 24, Claim 18, after "the" delete "detected".

Signed and Sealed this
Twelfth Day of November, 2019

Andrei Iancu
*Director of the United States Patent and Trademark Office*